United States Patent
Dang et al.

(10) Patent No.: US 10,323,338 B2
(45) Date of Patent: Jun. 18, 2019

(54) PROCESS FOR MAKING COMPOSITES COMPRISING RIGID-ROD POLYMERS AND GRAPHENE NANOPARTICLES

(71) Applicants: Thuy D. Dang, Centerville, OH (US); John D. Busbee, Beavercreek, OH (US)

(72) Inventors: Thuy D. Dang, Centerville, OH (US); John D. Busbee, Beavercreek, OH (US)

(73) Assignee: TJC Polymer Inc., Dayton, OH (US)

( * ) Notice: Subject to any disclaimer, the term of this patent is extended or adjusted under 35 U.S.C. 154(b) by 0 days.

(21) Appl. No.: 15/840,875

(22) Filed: Dec. 13, 2017

(65) Prior Publication Data
US 2018/0105957 A1    Apr. 19, 2018

Related U.S. Application Data

(62) Division of application No. 13/592,327, filed on Aug. 22, 2012, now Pat. No. 9,850,596.

(51) Int. Cl.
| | | |
|---|---|---|
| *D01F 6/74* | (2006.01) | |
| *C08K 3/04* | (2006.01) | |
| *C08J 5/00* | (2006.01) | |
| *C08J 5/18* | (2006.01) | |
| *C08J 7/00* | (2006.01) | |
| *D01F 1/10* | (2006.01) | |
| *C08K 7/00* | (2006.01) | |
| *D01D 5/04* | (2006.01) | |
| *B82Y 30/00* | (2011.01) | |

(52) U.S. Cl.
CPC .............. *D01F 6/74* (2013.01); *C08J 5/005* (2013.01); *C08J 5/18* (2013.01); *C08K 3/042* (2017.05); *C08K 7/00* (2013.01); *D01F 1/10* (2013.01); *B82Y 30/00* (2013.01); *C08J 2379/06* (2013.01); *C08J 2381/00* (2013.01); *D01D 5/04* (2013.01); *D10B 2331/021* (2013.01)

(58) Field of Classification Search
CPC .................................. D01F 6/74; C08K 3/042
See application file for complete search history.

(56) References Cited

U.S. PATENT DOCUMENTS

| | | | | |
|---|---|---|---|---|
| 2003/0083421 A1* | 5/2003 | Kumar | ............. | A61K 9/70 |
| | | | | 524/496 |
| 2011/0017955 A1* | 1/2011 | Zhamu | ............. | C08G 59/5033 |
| | | | | 252/511 |

* cited by examiner

Primary Examiner — Ling Siu Choi
Assistant Examiner — Thuy-Al N Nguyen
(74) Attorney, Agent, or Firm — Bart S. Hersko

(57) ABSTRACT

The present invention relates to composites comprising rigid-rod polymers and graphene nanoparticles, processes for the preparation thereof, nanocomposite films and fibers comprising such composites and articles containing such nanocomposite films and fibers.

20 Claims, 5 Drawing Sheets

PROCESS FOR MAKING COMPOSITES COMPRISING RIGID-ROD POLYMERS AND GRAPHENE NANOPARTICLES

This application is a divisional of U.S. application Ser. No. 13/592,327 filed on Aug. 22, 2012, issued as U.S. Pat. No. 9,850,596 on Dec. 26, 2017, which is expressly incorporated herein by reference in its entirety.

FIELD OF THE INVENTION

The present invention generally relates to new polymer composites comprising rigid-rod polymers and graphene nanoparticles and to methods for producing such composites.

BACKGROUND OF THE INVENTION

Graphene sheets are one-atom-thick planar sheets of $sp^2$-bonded carbon. The strongest bond in nature, the C—C bond, covalently locks these atoms in place giving them remarkable mechanical properties. A suspended single layer of graphene is one of the softest known materials characterized by a remarkably high Young's modulus of ~1 TPa. See, e.g., Bunch, J. S., at al., *Nano Letters*, Vol 8, No. 8, pp. 2458-2482 (2008). Theoretical and experimental results on single layer graphene nanosheets exhibit extremely high values of elastic modulus (~1,000 GPa), fracture strength (~100-400 GPa), thermal conductivity (~5,300 $Wm^{-1} K^{-1}$), mobility of charge earners (~200,000 $cm^2 V^{-1} s^{-1}$), large surface area (up to >2,600 $m^2/g$), and anomalous integer and fractional quantum Hall effect. These properties make graphene very promising for many applications such as solar cells and hydrogen storage, batteries, supercapacitors, sensors, and nanocomposites. See Stankovich, S., et al., *Nature*, Vol. 442, pp. 282-286 (2008) and Kuilla, T., et al., *Prog. Polym. Sci.*, Vol. 35. pp. 1350-1375 (2010).

To exploit the exceptional strength and conductive properties of graphene sheets, numerous attempts have been made to incorporate graphene sheets into polymers. However, one of the problems encountered in making polymer-graphene composites is the difficulty in achieving good dispersion of the graphene in the blend. As degree of graphene dispersion improves, the strength properties of the polymer composite correspondingly improve as well.

Layers of graphene tend to tightly agglomerate due to van der Waals forces. Dispersing graphene is difficult because graphene agglomerates can fall anywhere in the range of a few sheets to many hundreds of sheets thick. In order to obtain good graphene dispersion van der Waals force must be overcome but conventional methods used to disperse the graphene, such as sonication, can also damage the crystal structure of the sheet and, consequently, impair strength and tensile properties. Similarly, prior art methods employed to improve dispersion of graphene in a polymer matrix, in particular chemical functionalization of graphene, preclude high levels of loading of the graphene sheets in the polymer composite thus compromising the strength of the composite material.

Accordingly, it is an object of the present invention to provide thin layers of graphene sheets intercalated with polymer platelets to produce a graphene/polymer composite having exceptional tensile strength and elongation-to-break characteristics when compared with the base polymer of the polymer composite.

SUMMARY OF THE INVENTION

The present invention relates to new polymer composites in which graphene nanoparticles are well-dispersed in a polymer matrix. Advantageously, the polymer composites may be provided as sheets or fibers and thus may find application as bullet-proof vests, body armor, vehicular armor, ballistic protection equipment, and as reinforcing fibers for both organic and inorganic products, such as tire cords for automobile tires, machine belts, ceramics, polymer laminates for aircraft and other compositions requiring high strength materials.

Briefly, therefore, the present invention is directed to a polymer composite comprising a polymer and graphene nanoparticles dispersed in the polymer, the polymer comprising at least 50 wt % rigid rod polymer repeat units.

Another aspect of the present invention is a polymer composite fiber, the fiber comprising a polymer and graphene nanoparticles dispersed in the polymer, the polymer comprising at least 50 wt % rigid rod polymer repeat units.

Another aspect of the present invention is a polymer composite film, the film comprising a polymer and graphene nanoparticles dispersed in the polymer, the polymer comprising at least 50 wt % rigid rod polymer repeat units.

Another aspect of the present invention is a process for preparing a polymer composite, the process comprising forming a reaction mixture comprising rigid rod monomers and oligomers containing repeat units derived from the rigid rod monomer, the oligomers having, on average, about 5-10 repeat units, adding graphene nanoparticles to the reaction mixture, and polymerizing the reaction mixture to term a polymer composite comprising a polymer and graphene nanoparticles dispersed to the polymer, the polymer comprising at least 50 wt % rigid rod polymer repeat units.

Another aspect of the present invention are articles comprising polymer composite fiber, the fiber comprising a polymer and graphene nanoparticles dispersed in the polymer, the polymer comprising at least 50 wt % rigid rod polymer repeat units.

Another aspect of the present invention are articles comprising a polymer composite in fiber or film-form, the article being selected from the group consisting of bullet-proof vests, body armor, vehicular armor, ballistic protection equipment, tires, machine belts, ceramics, and aircraft.

Other objects and features will be in part apparent and in part pointed out hereinafter.

Abbreviations and Definitions

The following definitions and methods are provided to better define the present invention and to guide those of ordinary skill in the art in the practice of the present invention. Unless otherwise noted, terms are to be understood according to conventional usage by those of ordinary skill in the relevant art.

When introducing elements of the present invention or the preferred embodiment(s) thereof, the articles "a," "an," "the" and "said" are intended to mean that there are one or more of the elements. The terms "comprising," "including" and "having" ere intended to be inclusive and mean that there may be additional elements other than the listed elements.

Acyl: unless otherwise indicated, "acyl," as used alone or as part of another group, denotes moiety formed by removal of the hydroxyl group from the group —COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl or substituted hydrocarbyl.

Aliphatic: unless otherwise indicated, "aliphatic" or "aliphatic group" means an optionally substituted, non-aromatic hydrocarbon moiety. The moiety may be, for example, linear, branched, or cyclic mono or polycyclic such as fused, bridging, or spiro-fused polycyclic), or a combination thereof. Unless otherwise specified, aliphatic groups contain 1-20 carbon atoms.

Alkyl: unless otherwise indicated, the alkyl groups described herein are preferably lower alkyl containing from one to eight carbon atoms in the principal chain and up to 20 carbon atoms. They may be linear, branched or cyclic and include methyl, ethyl, propyl, butyl, hexyl and the like.

Amino: unless, otherwise indicated, the term "amino" as used herein alone or as part of another group denotes the moiety —NR$^1$R$^2$ wherein R$^1$, and R$^2$ are independently hydrogen, hydrocarbyl substituted hydrocarbyl or heterocyclo.

Amine or amino: unless otherwise indicated, the term "amine" or "amino" refers to a group of formula —N(X$_8$)(X$_9$), wherein X$_8$ and X$_9$ are independently hydrogen, hydrocarbyl, substituted hydrocarbyl, heteroaryl, or heterocyclo, or X$_8$ and X$_9$ taken together form a substituted or unsubstituted alicyclic, aryl, or heterocyclic moiety, each as defined in connection with such term, typically having from 3 to 8 atoms in the ring, "Substituted amine," for example, refers to a group of formula —N(X$_8$)(X$_9$), wherein at least one of X$_8$ and X$_9$ are other than hydrogen. "Unsubstituted amine," for example, refers to a group of formula —N(X$_8$)(X$_9$), wherein X$_8$ and X$_9$ are both hydrogen.

Amide or Amido: unless otherwise indicated, the "amide" or "amido" moieties represent a group of the formula —CONR$^1$R$^2$ wherein R$^1$ and R$^2$ are as defined in connection with the term "amino." "Substituted amide," for example, refers to a group of the formula —CONR$^1$R$^2$ wherein at least one of R$^1$ and R$^2$ are other than hydrogen. "Unsubstituted amido," for example, refers to a group of the formula —CONR$^1$R$^2$, wherein R$^1$ and R$^2$ are each hydrogen.

Aryl: unless otherwise indicated, the term "aryl," "aryl group" or simply "Ar" refers to optionally substituted monocyclic, bicyclic, and tricyclic ring systems having a total of five to fourteen ring members, wherein at least one ring in the system is aromatic and wherein each ring in the system contains three to seven ring members. The terms "aryl," "aryl group" or "ar" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

Block Copolymer: unless otherwise indicated, a "block copolymer" comprises two or more homopolymer or copolymer subunits linked by covalent bonds. Block copolymers with two or three distinct blocks are called diblock copolymers and triblock copolymers, respectively. A schematic generalization of a diblock copolymer is represented by the formula [A$_a$B$_b$C$_c$ . . . ]$_m$-[X$_x$Y$_y$Z$_z$ . . . ]$_n$ wherein each letter stands for a constitutional or monomeric unit, and wherein each subscript to a constitutional unit represents the mole fraction of that unit in the particular block, the three dots indicate that there may be more (there may also be fewer) constitutional units in each block and m and n indicate the molecular weight of each block in the diblock copolymer. As suggested by the schematic, in some instances, the number and the nature of each constitutional unit is separately controlled for each block. The schematic is not meant and should not be construed to infer any relationship whatsoever between the number of constitutional units or the number of different types of constitutional units in each of the blocks.

Nor is the schematic meant to describe any particular number or arrangement of the constitutional units within a particular block. In each block the constitutional units may be disposed in a purely random, an alternating random, a regular alternating, a regular block or a random block configuration unless expressly stated to be otherwise. A purely random configuration, for example, may have the non-limiting form: X-X-Y-Z-X-Y-Y-Z-Y-Z-Z-Z . . . . A non-limiting, exemplary alternating random configuration may have the non-limiting form: X-Y-X-Z-Y-X-Y-Z-Y-X-Z . . . , and an exemplary regular alternating configuration may have the non-limiting form: X-Y-Z-X-Y-Z-X-Y-Z . . . . An exemplary regular block configuration may have the following non-limiting configuration: . . . X-X-X-Y-Y-Y-Z-Z-Z-X-X-X . . . , while an exemplary random block configuration may have the non-limiting configuration: . . . X-X-X-Z-Z-X-X-Y-Y-Y-Y-Z-Z-Z-X-X-Z-Z-Z- . . . . In none of the preceding generic examples is the particular juxtaposition of individual constitutional units or blocks or the number of constitutional units in a block or the number of blocks meant nor should they be construed as in any manner bearing on or limiting the actual structure of block copolymers forming a micelle described herein. As used herein, the brackets enclosing the constitutional units are not meant and are not to be construed to mean that the constitutional units themselves form blocks. That is, the constitutional units within the square brackets may combine in any manner with the other constitutional units within the block, i.e., purely random, alternating random, regular alternating, regular block or random block configurations. The block copolymers described herein are, optionally, alternate, gradient or random block copolymers.

Carbocyclic: unless otherwise indicated, the term "carbocyclic" as used herein alone or as part of another group refers to a saturated or unsaturated monocyclic or bicyclic ring in which all atoms of all rings are carbon. Thus, the term includes cycloalkyl and aryl rings. The carbocyclic ring(s) may be substituted or unsubstituted. Exemplary substituents include one or more of the following groups: hydrocarbyl, substituted hydrocarbyl keto, hydroxy, protected hydroxy, acyl, acyloxy, alkoxy, alkenoxy, alkynoxy, aryloxy, halogen, amido, amino, nitro, cyano, thiol, ketals, acetals, esters and ethers.

Copolymer: unless otherwise indicated, "copolymer" refers to a polymer derived from two, three or more monomeric species and includes alternating copolymers, periodic copolymers, random copolymers, statistical copolymers and black copolymers.

Cyano: unless otherwise indicated, the term "cyano," as used herein alone or as part of another group, denotes a group of formula —CN.

Extended rod polymer repeat unit: unless otherwise indicated, "extended rod polymer repeat unit" or "extended rod repeat unit" as used herein describes a repeat unit other than a rigid rod polymer repeat unit in which all exocyclic bonds of the aromatic/heterocyclic moieties within the repeat unit have a catenation angle of 180°±35°. Stated differently, the exocyclic bonds of the aromatic/heterocyclic units within a repeat unit of an extended rod polymer repeat unit have a catenation angle greater than 180° but less than 215° or a catenation angle less than 180° but greater than 145°.

Graphene: unless otherwise indicated, the term "graphene" or "graphene sheet" denotes a one-atom-thick layer of sp$^2$-bonded carbon atoms that are densely packed in a honeycomb crystal lattice.

Graphene nanoparticles: unless otherwise indicated, the term "graphene nanoparticles" denotes a graphene sheet or a crystalline, non-graphitic nanoparticle comprising two or more graphene sheets in a stacked arrangement.

Graphite: unless otherwise indicated, the term "graphite" denotes a structure comprised of at least 100 graphene sheets. For example, a "non-graphic" graphene nanoparticle sheet comprises fewer than 100 graphene sheets.

Heteroaryl: unless otherwise indicated, the term "heteroaryl" means an aryl group wherein at least one of the ring members is a heteroatom, and preferably 5 or 6 atoms in each ring. The heteroaromatic group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heteroaromatics include furyl thienyl, pyridyl oxazolyl, pyrrolyl indolyl, quinolinyl, or isoquinolinyl and the like. Exemplary substituents include one or more of the following groups: hydrocarbyl, substituted hydrocarbyl, keto (i.e., =O), hydroxy, protected hydroxy, acyl, acyloxy, alkoxy, alkenoxy, alkynoxy, aryloxy, halogen, amido, amino, nitro, cyano, thiol, ketals, acetals, esters and ethers.

Heteroatom: unless otherwise indicated, the term "heteroatom" means an atom other than hydrogen or carbon, such as a chlorine, iodine, bromine, oxygen, sulfur, nitrogen, phosphorus, boron, arsenic, selenium or silicon atom.

Heterocyclo: unless otherwise indicated, the terms "heterocyclo" and "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include heteroaromatics such as furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, ketals, acetate, esters and ethers.

Hydrocarbon: unless otherwise indicated, the terms "hydrocarbon" and "hydrocarbyl" as used herein describe organic compounds or radicals consisting exclusively of the elements carbon and hydrogen. These moieties include alkyl, alkenyl, alkynyl and aryl moieties. These moieties also include alkyl alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

Non-extended/rigid rod polymer repeat unit: unless otherwise indicated, "non-extended/rigid rod polymer repeat unit" or "non-extended/rigid rod repeat unit" as used herein describes a repeat unit that is not a rigid rod polymer repeat unit or an extended rod repeat unit.

Number Average: unless otherwise indicated, the terms "number average" or "average" as used herein in connection with the size of graphene nanoparticles means the average number of graphene sheets comprised by each of at least 30 graphene nanoparticles in each of at least four separate regions of the composite, as determined by transmission electron microscopy ("TEM").

Polymer: unless otherwise indicated, "polymer" includes natural and synthetic, homopolymers and copolymers comprising multiple repeat units and, unless otherwise indicated, may be linear, branched, or dendritic. Examples of copolymers include, but are not limited to, random copolymers and block copolymers.

Rigid rod copolymer: unless otherwise indicated, "rigid rod copolymer" as used herein describes a copolymer comprising rigid rod polymer repeat units and extended rod repeat units or non-extended/rigid rod repeat units.

Rigid rod polymer: unless otherwise indicated, "rigid rod polymer" as used herein describes a homopolymer comprising rigid rod polymer repeat units.

Rigid rod polymer repeat unit: unless otherwise indicated, "rigid rod polymer repeat unit" or "rigid rod repeat unit" as used herein describes a repeat unit in which all exocyclic bonds of the aromatic/heterocyclic moieties within the repeat unit have a catenation angle of 180°.

Substituted hydrocarbyl: unless otherwise indicated, the "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters, ethers, and thioethers.

DETAILED DESCRIPTION OF ILLUSTRATIVE EMBODIMENTS

Figure 1:
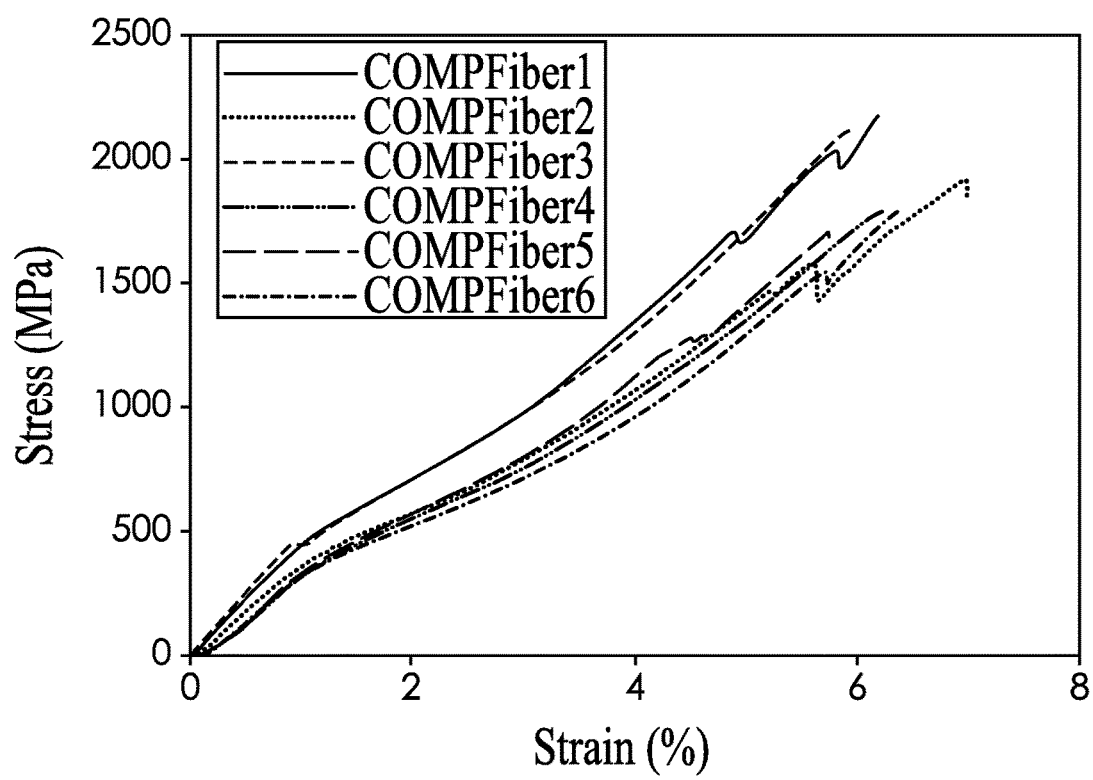
FIG. 1 shows typical stress-strain curves for BBL and BBL/GS (80/20) fibers as more fully described in Example XVI.

In general, the polymer composites of the present invention contain graphene nanoparticles that are well-dispersed in a polymer matrix. As a result, one or more properties of the polymer composite are improved relative to the base polymer of the polymer composite (i.e., an otherwise identical composition but lacking the graphene nanoparticles). For example, in one embodiment the tensile strength of the polymer composite is at least 50% greater than the tensile strength of the base polymer of the polymer composite; in some embodiments the tensile strength of the polymer composite is at least 60%, 100%, or even 200% greater than the tensile strength of the base polymer of the polymer composite. By way of further example, in one embodiment the elongation-to-break characteristics of the polymer composite is at least 50% greater than the tensile strength of the base polymer of the polymer composite; in some embodiments the tensile strength of the polymer composite is at least 100%, 200%, or even 500% greater than the elongation-to-break characteristics of the base polymer of the polymer composite. By way of further example, in one embodiment the tensile modulus of the composite film is at least 35%, 37%, 40%, 50% or even 100% greater than the tensile modulus of the base polymer.

Graphene nanoparticles comprised by the polymer composites are crystalline and non-graphitic. That is, the graphene nanoparticles contain less than 100 graphene layers in a stacked arrangement. In certain embodiments, the graphene nanoparticles comprised by the polymer matrix have, on average (number average), fewer than 75 graphene layers in a stacked arrangement. For example, in some embodiments the graphene nanoparticles comprised by the polymer matrix have, on average, fewer than 50 graphene layers in a stacked arrangement. By way of further example, the graphene nanoparticles comprised by the polymer matrix have, on average, fewer than 40 graphene layers in a stacked arrangement. By way of further example, the graphene nanoparticles comprised by the polymer matrix have, on average, fewer than 30 graphene layers in a slacked arrangement. By way of further example, the graphene nanoparticles comprised by the polymer matrix have, on average, fewer than 25 graphene layers in a stacked arrangement. By way of further example, the graphene nanoparticles comprised by the polymer matrix have, on average, fewer than 15 graphene layers in a stacked arrangement. By way of further example, the graphene nanoparticles comprised by the polymer matrix have, on average, fewer than 10 graphene layers in a stacked arrangement.

In general the graphene nanoparticles may comprise graphene, graphene oxide or chemically-functionalized graphene. In a further aspect, the suspension comprises a graphite or graphene material that has been modified from a starting graphite or graphene material. In one aspect, modified graphite and graphene materials include without limitation at least one of chemically-functionalized graphene, reduced graphene, graphene, or a combination thereof. An example of reduced graphene is highly reduced graphene. In one aspect, the graphene material can be highly reduced graphene. "Highly reduced graphene" refers to graphene oxide that has been substantially reduced, or, for example, reduced to a level that imparts a desired conductivity to the reduced graphene. Thus, in one aspect, the graphene material can be electrically conductive. It is known in the art that oxygen containing functional groups, when present on graphene, can interfere with electrical conductivity. It should be noted that it is not necessary that a reduced or highly reduced graphene material comprise only hydrogen and carbon elements. In one aspect, a reduced or highly reduced graphene is fully hydrogenated. In another aspect, one or more sites of a reduced or highly reduced graphene material can comprise another element, such as for example, a nitrogen or oxygen.

In a still further aspect, the graphene material can be chemically-functionalized graphene, including chemically-modified graphene (CMG), which includes one-atom thick sheets of carbon optionally functionalized with other elements. If a particular surface of a chemically modified graphene material, or a portion thereof, is functionalization, such functionalization can, in various aspects, comprise multiple functional groups and can be uniform or can vary across any portion of the surface. For example, in one embodiment, the graphene nanoparticles comprise sulfonated graphene sheets that are dispersible in an aqueous solution. By way of further example, the graphene may be dispersible in acid such as phosphoric acid or methanesulfonic acid. By way of further example, the graphene may alternatively be functionalized with at least one nonpolar group selected from the group consisting of alkyl groups, aryl groups, alkoxy groups, alkylaryl groups, alkoxyaryl groups, and combinations thereof. Other functional groups may be attached depending on the end use of the graphene nanoparticles as readily understood by one skilled in the art.

The polymer composites of the present invention typically comprise at least about 1 wt % graphene nanoparticles. For example, in one embodiment, the polymer composite comprises at least 5 wt % graphene nanoparticles. By way of further example, in one embodiment the polymer composite comprises at least 7.5 wt % graphene nanoparticles. By way of further example, in one embodiment the polymer composite composes at least 10 wt % graphene nanoparticles. By way of further example, in one embodiment the polymer composite comprises at least 15 wt % graphene nanoparticles. In general, however, the loading of the graphene nanoparticles in the polymer composite will typically not exceed about 50 wt %. For example, in one embodiment the polymer composite comprises no more than about 40 wt % graphene nanoparticles. By way of further example, in one embodiment the polymer composite comprises no more than 35 wt % graphene nanoparticles. By way of further example, in one embodiment the polymer composite comprises no more than 30 wt % graphene nanoparticles. For certain applications, the polymer composite will contain about 5 to about 35 wt % graphene nanoparticles. For example, in some applications the graphene nanoparticle content of the polymer composite will range between about 10 wt % and about 35 wt %. By way of further example, in some applications the graphene nanoparticle content of the polymer composite will range between about 12.5 wt % and about 36 wt %. By way of further example, in some applications the graphene nanoparticle content of the polymer composite will range between about 15 wt % and about 30 wt %.

Independent of the loading, the polymer composites of the present invention are characterized by a good dispersion of the graphene nanoparticles in the polymer matrix even at relatively high loadings. For example, in one embodiment, the polymer composite comprises at least 5 wt % graphene nanoparticles having, on average (number average), fewer than 50 graphene sheets per nanoparticle. By way of further example in one embodiment the polymer composite comprises at least 10 wt % graphene nanoparticles having, on average (number average), fewer than 50 graphene sheets per nanoparticle. By way of further example, in one embodiment, the polymer composite comprises at least 15 wt % graphene nanoparticles having, on average (number average), fewer than 50 graphene sheets per nanoparticle. By way of further example in one embodiment, the polymer composite comprises at least 20 wt % graphene nanoparticles having, on average (number average), fewer than 50 graphene sheets per nanoparticle. By way of further example, in one embodiment the polymer composite comprises at least 25 wt % graphene nanoparticles having, on average (number average), fewer than 50 graphene sheets per nanoparticle. By way of further example in one embodiment the polymer composite comprises, at least 30 wt % graphene nanoparticles having, on average (number average), fewer than 50 graphene sheets per nanoparticle. By way of further example, in one embodiment, the polymer composite comprise at least 35 wt % graphene nanoparticles having, on average (number average), fewer than 50 graphene sheets per nanoparticle. By way of further example in one embodiment, the polymer composite comprises at least 40 wt % graphene nanoparticles having, on average (number average), fewer than 50 graphene sheets per nanoparticle. By way of further example, in one embodiment, the polymer composite comprises at least 5 wt % graphene nanoparticles having, on average (number average), fewer than 25 graphene sheets per nanoparticle. By way of further example in one embodiment, the polymer composite comprises at least 10 wt % graphene nanoparticles having, on average (number average), fewer than 25 graphene sheets per nanoparticle. By way of further example, in one embodiment, the polymer composite comprises at least 15 wt % graphene nanoparticles having, on average (number average), fewer than 25 graphene sheets per nanoparticle. By way of further example in one embodiment, the polymer composite comprises at least 20 wt % graphene nanoparticles having, on average (number average), fewer than 25 graphene sheets per nanoparticle. By way of further example, in one embodiment, the polymer composite comprises at least 25 wt % graphene nanoparticles having, on average (number average), fewer than 25 graphene sheets per nanoparticle. By way of further example in one embodiment, the polymer composite comprises at least 30 wt % graphene nanoparticles having, on average (number average), fewer than 25 graphene sheets per nanoparticle. By way of further example, in one embodiment, the polymer composite comprises at least 35 wt % graphene nanoparticles having, on average (number average), fewer than 25 graphene sheets per nanoparticle. By way of further example in one embodiment, the polymer composite comprises at least 40 wt % graphene nanoparticles having, on average (number average), fewer than 25 graphene sheets per nanoparticle. By way of further example, in one embodiment, the polymer composite comprises at least 5 wt % graphene nanoparticles having, on average (number average), fewer than 10 graphene sheets per nanoparticle. By way of further example in one embodiment, the polymer composite comprises at least 10 wt % graphene nanoparticles having, on average (number average), fewer than 10 graphene sheets per nanoparticle. By way of further example, in one embodiment the polymer composite comprises at least 15 wt % graphene nanoparticles having, on average (number average), fewer than 10 graphene sheets per nanoparticle. By way of further example in one embodiment, the polymer composite comprises at least 20 wt % graphene nanoparticles having, on average (number average), fewer than 10 graphene sheets per nanoparticle. By way of further example, in one embodiment, the polymer composite comprises at least 25 wt % graphene nanoparticles having, on average (number average), fewer than 10 graphene sheets per nanoparticle. By way of further example in one embodiment, the polymer composite comprises at least 30 wt % graphene nanoparticles having, on average (number average), fewer than 10 graphene sheets per nanoparticle. By way of further example, in one embodiment, the polymer composite comprises at least 35 wt % graphene nanoparticles having, on average (number average), fewer than 10 graphene sheets per nanoparticle. By way of further example in one embodiment, the polymer composite comprises at least 40 wt % graphene nanoparticles having, on average (number average), fewer than 10 graphene sheets per nanoparticle. By way of further example, in one embodiment, the polymer composite comprises at least 5 wt % graphene nanoparticles having, on average (number average), 3 to 8 graphene sheets per nanoparticle. By way of further example in one embodiment, the polymer composite comprises at least 10 wt % graphene nanoparticles having, on average (number average), 3 to 8 graphene sheets per nanoparticle. By way of further example, in one embodiment, the polymer composite comprises at least 15 wt % graphene nanoparticles having, on average (number average), 3 to 8 graphene sheets per nanoparticle. By way of further example in one embodiment, the polymer composite comprises at least 20 wt % graphene nanoparticles having, on average (number average), 3 to 8 graphene sheets per nanoparticle. By way of further example, in one embodiment, the polymer composite comprises at least 25 wt % graphene nanoparticles having, on average (number average), 3 to 8 graphene sheets per nanoparticle. By way of further example in one embodiment, the polymer composite comprises at least 30 wt % graphene nanoparticles having, on average (number average), 3 to 8 graphene sheets per nanoparticle. By way of further example, in one embodiment, the polymer composite comprises at least 35 wt % graphene nanoparticles having, on average (number average), 3 to 8 graphene sheets per nanoparticle. By way of further example in one embodiment, the polymer composite comprises at least 40 wt % graphene nanoparticles having, on average (number average), 3 to 8 graphene sheets per nanoparticle.

The polymer comprised by the polymer composites of the present invention are preferably a step-growth polymer (that is, a polymer formed by step-growth polymerization). In one exemplary embodiment, the polymer is a homopolymer or a copolymer comprising the residues of two or more monomers. For example, in one embodiment the polymer is a homopolymer. By way of further example, in one embodiment the polymer is a random copolymer comprising the residues of two or more monomers. By way of further example, in one embodiment the polymer is a block copolymer comprising at least two polymer blocks comprising the residues of different monomers. By way of further example, in one embodiment the polymer is a block copolymer comprising at least three polymer blocks comprising the residues of different monomers.

The polymer comprised by the polymer composites may have a range of molecular weights. Typically, the polymer component will have an average molecular weight ($M_w$) of at least about 10,000. In certain embodiments, the polymer component of the polymer composite will have an average molecular weight ($M_w$) of at least about 17,000. In general, however, the polymer component of the polymer composite will have an average molecular weight ($M_w$) of less than about 100,000.

Generally speaking, the polymers comprised by the polymer composites are rigid, substantially linear, thermally stable aromatic/heterocyclic polymers. In one embodiment, a majority of the repeat units of the polymer are para-catenated, i.e., the exocyclic bonds of the aromatic/heterocyclic moieties within the repeat unit have a catenation angle of 180°.

In one embodiment at least 50 wt % of the polymeric component of the polymer composite are repeat units in which all exocyclic bonds of the aromatic/heterocyclic moieties within the repeat unit have a catenation angle of 180°. By way of further example, in one embodiment at least 60 wt % of the polymeric component of the polymer composite are repeat units in which all exocyclic bonds of the aromatic/heterocyclic moieties within the repeat unit have a catenation angle of 180°. By way of further example, in one embodiment at least 70% of the polymeric repeat units have a catenation angle of 180°. By way of further example, in one embodiment at least 80 wt % of the polymeric component of the polymer composite are repeat units in which all exocyclic bonds of the aromatic/heterocyclic moieties within the repeat unit have a catenation angle of 180°. By way of further example, in one embodiment at least 90 wt % of the polymeric component of the polymer composite are repeat units in which all exocyclic bonds of the aromatic/heterocyclic moieties within the repeat unit have a catenation angle of 180°.

In some embodiments, the polymer may contain a significant fraction of repeat units in which all exocyclic bonds of the aromatic/heterocyclic moieties within the polymer repeat units have a catenation angle falling within the range of 145° to 215°. For example, in one embodiment, polymer repeat units in which all exocyclic bonds of the aromatic/heterocyclic moieties within the repeat units have a catenation angle falling within the range of 145° to 215° constitute at least 60 wt % of the polymer. By way of further example, in one embodiment polymer repeat units in which all exocyclic bonds of the aromatic/heterocyclic moieties within the repeat units have a catenation angle falling within the range of 145° to 215° constitute at least 70 wt % of the polymer. By way of further example, in one embodiment polymer repeat units in which all exocyclic bonds of the aromatic/heterocyclic moieties within the repeat units have a catenation angle falling within the range of 145° to 215° constitute at least 80 wt % of the polymer. By way of further example, in one embodiment polymer repeat units in which all exocyclic bonds of the aromatic/heterocyclic moieties within the repeat units have a catenation angle falling within the range of 145° to 215° constitute at least 90 wt % of the polymer. In each of the foregoing embodiments, the polymer repeat units in which all exocyclic bonds of the aromatic/heterocyclic moieties within the repeat units have a catenation angle falling within the range of 145° to 215° may be rigid rod polymer repeat units or extended rod polymer repeat units provided at least 50 wt % of the polymer is derived from rigid rod polymer repeat units.

In some embodiments, the polymer component of the polymer composite is predominantly comprised of rigid rod polymer repeat units and extended rod polymer repeat units. For example, in one embodiment at least 55 wt % of the polymer is derived from extended rod polymer repeat units or rigid rod polymer repeat unit. By way of further example, in one embodiment at least 60 wt % of the polymer is derived from extended rod polymer repeat units or rigid rod polymer repeat units. By way of further example, in one embodiment at least 65 wt % of the polymer is derived from extended rod polymer repeat units or rigid rod polymer repeat units. By way of further example, in one embodiment at least 70 wt % of the polymer is derived from extended rod polymer repeat units or rigid rod polymer repeat units. By way of further example, in one embodiment at least 75 wt % of the polymer is derived from extended rod polymer repeat units or rigid rod polymer repeat units. By way of further example, in one embodiment at least 80 wt % of the polymer is derived from extended rod polymer repeat units or rigid rod polymer repeat units. By way of further example, in one embodiment at least 85 wt % of the polymer is derived from extended rod polymer repeat units or rigid rod polymer repeat units. By way of further example, in one embodiment at least 90 wt % of the polymer is derived from extended rod polymer repeat units or rigid rod polymer repeat units. In each of the foregoing exemplary embodiments, the rigid rod polymer repeat units preferably constitute at least 55 wt % or more of the polymer. For example, in one embodiment at least 60 wt % of the polymer is derived from extended rod polymer repeat units and rigid rod polymer repeat units with at least 55 wt % of the polymer being derived from rigid rod polymer repeat units. By way of further example, in one embodiment at least 70 wt % of the polymer is derived from extended rod polymer repeat units and rigid rod polymer repeat units with at least 55 wt % of the polymer being derived from rigid rod polymer repeat units. By way of further example, in one embodiment at least 80 wt % of the polymer is derived from extended rod polymer repeat units and rigid rod polymer repeat units with at least 60 wt % of the polymer being derived from rigid rod polymer repeat units. By way of further example, in one embodiment at least 90 wt % of the polymer is derived from extended rod polymer repeat units and rigid rod polymer repeat units with at least 55 wt % of the polymer being derived from rigid rod polymer repeat units. By way of further example, in one embodiment at least 90 wt % of the polymer is derived from extended rod polymer repeat units and rigid rod polymer repeat units with at least 55 wt % of the polymer being derived from rigid rod polymer repeat units. In one embodiment at least 90 wt % of the polymer is derived from extended rod polymer repeat units and rigid rod polymer repeat units with at least 60 wt % of the polymer being derived from rigid rod polymer repeat units. By way of further example, in one embodiment at least 90 wt % of the polymer is derived from extended rod polymer repeat units and rigid rod polymer repeat units with at least 70 wt % of the polymer being derived from rigid rod polymer repeat units. By way of further example, in one embodiment at least 90 wt % of the polymer is derived from extended rod polymer repeat units and rigid rod polymer repeat units with at least 80 wt % of the polymer being derived from rigid rod polymer repeal units.

In one embodiment, the polymer comprised by the polymer composite is a rigid-rod polymer or a rigid-rod/extend rod copolymer. Rigid rod polymers are typically characterized by high tensile strength, high modulus, stiffness, and thermal stability. Such polymers are also sometimes referred to as liquid crystal extended chain polymers. In one such embodiment the polymer composite comprises a homopolymer or a copolymer containing rigid rod polymer repeat units corresponding to Formula 1 or Formula 2:

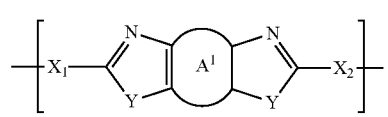

Formula 1

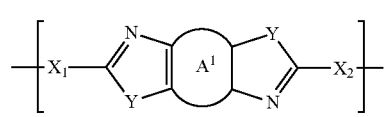

Formula 2 wherein the $A^1$ ring is a six-membered aromatic or a six-membered heterocyclic ring, Y is —O—, —S— or —NR', R' is hydrogen, hydrocarbyl, substituted hydrocarbyl or acyl, and $X_1$ and $X_2$ are independently a bond, para-ordered aryl or para-ordered heterocyclic ring.

In one embodiment, the polymer composite comprises a homopolymer or a copolymer containing rigid rod polymer repeat units corresponding to Formula 1 or Formula 2 wherein the $A^1$ ring is selected from the group consisting of

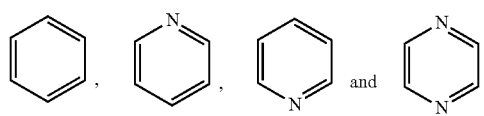

and the polymer composite comprises a homopolymer or a copolymer containing rigid rod polymer repeat units corresponding to Formula 1A, 1B, 1C, 1D, 2A, 2B, 2C, or 2D:

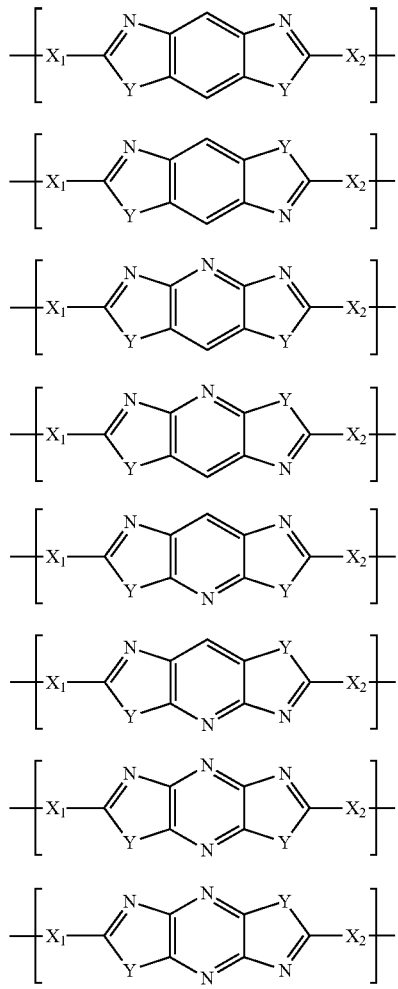

wherein Y is —O—, —S— or —NR', R' is hydrogen, hydrocarbyl, substituted hydrocarbyl or acyl, and $X_1$ and $X_2$ are independently a bond, para-ordered aryl or para-ordered heterocyclic ring. In one such embodiment, $X_1$ and $X_2$ are each a bond. In another such embodiment, one of $X_1$ and $X_2$ is a bond and the other is optionally substituted para-ordered arylene or optionally substituted para-ordered heterocycle corresponding to Formula 3

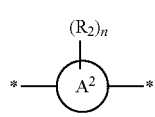

Formula 3 wherein n is 0-4, each $R_2$ is independently hydrogen, hydrocarbyl, substituted hydrocarbyl, hydroxy, halo, phospho (—$PO_3H$), or sulfo (—$SO_3H$), and "*" designates the point of attachment of the $A^2$ ring system to the remainder of the repeat unit. For example, in one embodiment, the $A^2$ ring system is an optionally substituted phenylene, pyridine, pyran, thiopyran, diazine, oxazine, thiamine, dioxine, triazine or tetrazine ring. By way of further example, in one embodiment, one of $X_1$ and $X_2$ is a bond and the other is optionally substituted para-ordered phenylene or an optionally substituted para-ordered six-membered heterocycle corresponding to Formula 3A, 3B or 3C

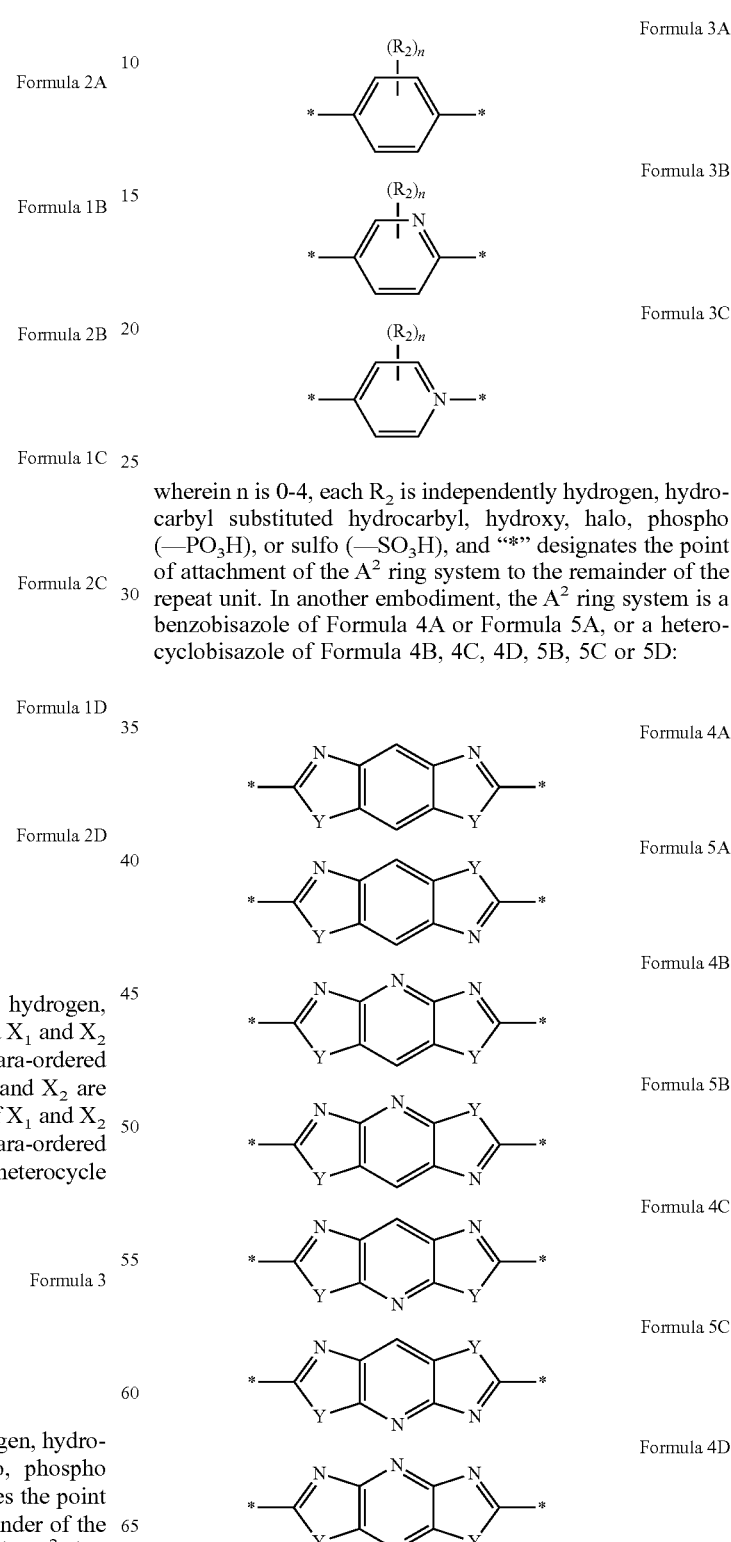

wherein n is 0-4, each $R_2$ is independently hydrogen, hydrocarbyl substituted hydrocarbyl, hydroxy, halo, phospho (—$PO_3H$), or sulfo (—$SO_3H$), and "*" designates the point of attachment of the $A^2$ ring system to the remainder of the repeat unit. In another embodiment, the $A^2$ ring system is a benzobisazole of Formula 4A or Formula 5A, or a heterocyclobisazole of Formula 4B, 4C, 4D, 5B, 5C or 5D:

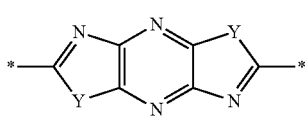

Formula 5D wherein Y is —O—, —S— or —NR', R' is hydrogen, hydrocarbyl, substituted hydrocarbyl or acyl, and "*" designates the point of attachment of the ring system of Formula 4A, 4B, 4C, 4D, 5A, 5B, 5C or 5D to the remainder of the repeat unit. By way of further example, in another embodiment $X_1$ and $X_2$ are independently optionally substituted para-ordered arylene or optionally substituted para-ordered heterocycle corresponding to Formula 3.

In one embodiment in which the polymer composite comprises a homopolymer or a copolymer containing rigid rod polymer repeat units corresponding to Formula 1A, 1B, 1C, 1D, 2A, 2B, 2C or 2D, Y is —S— and the homopolymer or copolymer contains rigid rod polymer repeat units corresponding to Formula 1E, 1F, 1G, 1H, 2E, 2F, 2G, or 2H

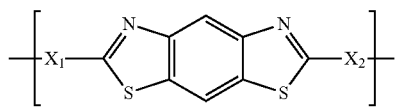

Formula 1E

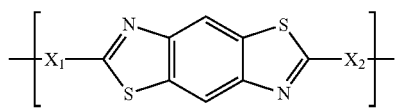

Formula 2E

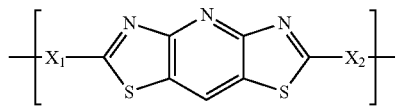

Formula 1F

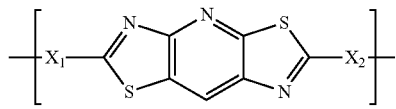

Formula 2F

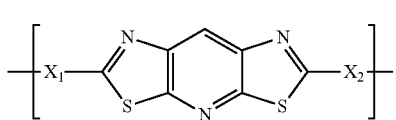

Formula 1G

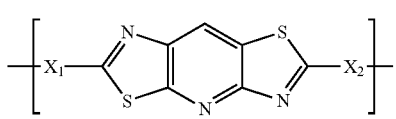

Formula 2G

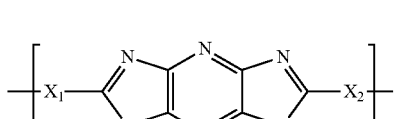

Formula 1H

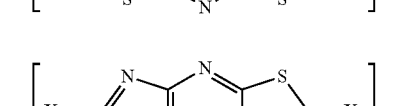

Formula 2H wherein $X_1$ and $X_2$ are independently a bond, para-ordered aryl or para-ordered heterocyclic ring. In one such embodiment, $X_1$ and $X_2$ are each a bond. In another such embodiment, one of $X_1$ and $X_2$ is a bond and the other is optionally substituted para-ordered arylene or optionally substituted para-ordered heterocycle corresponding to Formula 3

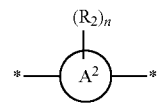

Formula 3 wherein n is 0-4, each $R_2$ is independently hydrogen, hydrocarbyl, substituted hydrocarbyl, hydroxy, halo, phospho (—PO₃H), or sulfo (—SO₃H), and "*" designates the point of attachment of the $A^2$ ring system to the remainder of the repeat unit. For example, in one embodiments, the $A^2$ ring system is an optionally substituted phenylene, pyridine, pyran, thiopyran, diazine, oxazine, thiamine, dioxine, triazine or tetrazine ring. By way of further example, in one embodiment, one of $X_1$ and $X_2$ is a bond and the other is optionally substituted para-ordered phenylene or an optionally substituted para-ordered six-membered heterocyclic corresponding to Formula 3A, 3B or 3C

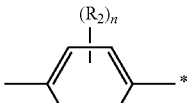

Formula 3A

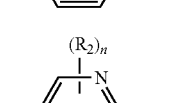

Formula 3B

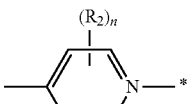

Formula 3C wherein n is 0-4, each $R_2$ is independently hydrogen, hydrocarbyl, substituted hydrocarbyl, hydroxy, halo, phospho (—PO₃H), or sulfo (—SO₃H), and "*" designates the point of attachment of the $A^2$ ring system to the remainder of the repeat unit. In another embodiment, the $A^2$ ring system is a benzobisazole of Formula 4A or Formula 5A, or a heterocyclobisazole of Formula 4B, 4C, 4D, 5B, 5C or 5D:

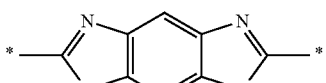

Formula 4A

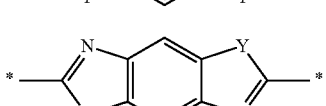

Formula 5A

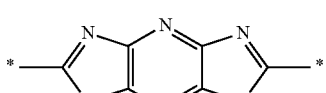

Formula 4B

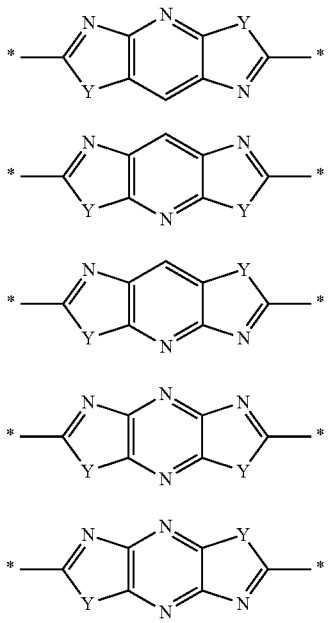

wherein Y is —O—, —S— or —NR', R' is hydrogen, hydrocarbyl, substituted hydrocarbyl or acyl, and "*" designates the point of attachment of the ring system of Formula 4A, 4B, 4C, 4D, 5A, 5B, 5C or 5D to the remainder of the repeat unit. By way of further example, in another embodiment $X_1$ and $X_2$ are independently optionally substituted para-ordered arylene or optionally substituted para-ordered heterocycle corresponding to Formula 3.

In one embodiment in which the polymer composite comprises a homopolymer or a copolymer containing rigid rod polymer repeat units corresponding to Formula 1A, 1B, 1C, 1D, 2A, 2B, 2C or 2D, Y is —N— and the homopolymer or copolymer contains rigid rod polymer repeat units corresponding to Formula 1I, 1J, 1K, 1L, 2I, 2J, 2K, or 2L

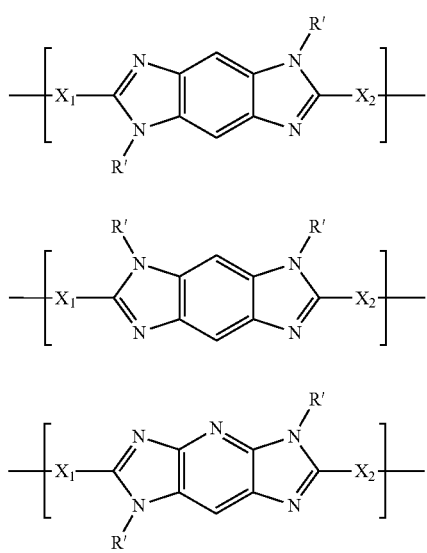

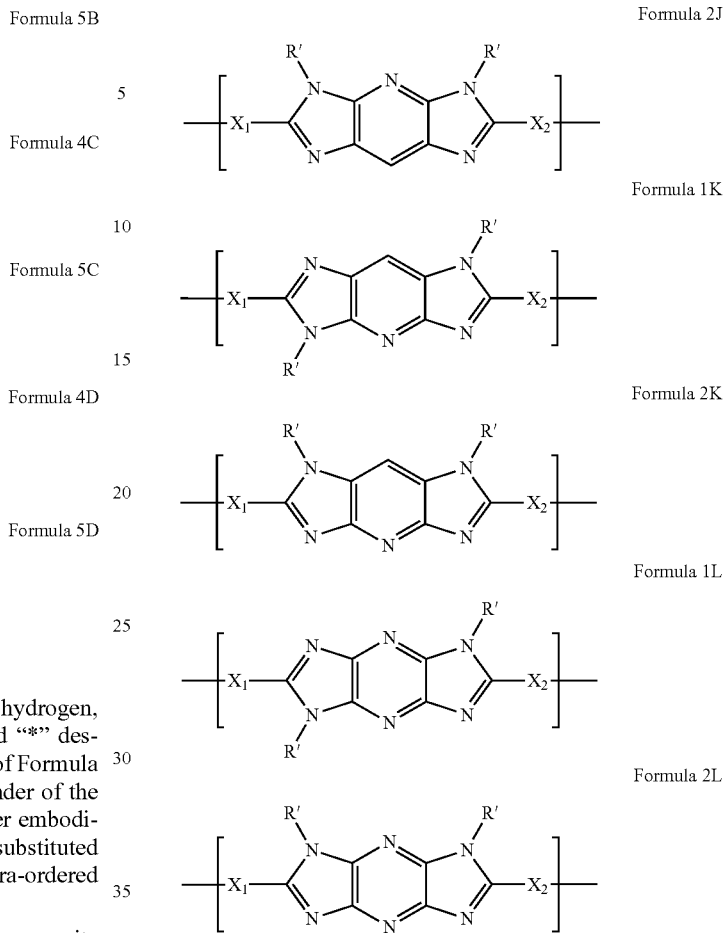

wherein R' is hydrogen, hydrocarbyl, substituted hydrocarbyl or acyl, $X_1$ and $X_2$ are independently a bond, para-ordered aryl or para-ordered heterocyclic ring. In one such embodiment $X_1$ and $X_2$ are each a bond. In another such embodiment, one of $X_1$ and $X_2$ is a bond and the other is optionally substituted para-ordered arylene or optionally substituted para-ordered heterocycle corresponding to Formula 3

wherein n is 0-4, each $R_2$ is independently hydrogen, hydrocarbyl, substituted hydrocarbyl, hydroxy, halo, phospho (—PO$_3$H), or sulfo (—SO$_3$H), and "*" designates the point of attachment of the $A^2$ ring system to the remainder of the repeat unit. For example, in one embodiment, the $A^2$ ring system is an optionally substituted phenylene, pyridine, pyran, thiopyran, diazine, oxazine, thiamine, dioxine, triazine or tetrazine ring. By way of further example, in one embodiment, one of $X_1$ and $X_2$ is a bond and the other is optionally substituted para-ordered phenylene or an optionally substituted para-ordered six-membered heterocyclic corresponding to Formula 3A, 3B or 3C

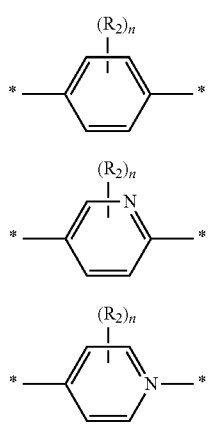

Formula 3A

Formula 3B

Formula 3C wherein n is 0-4, each $R_2$ is independently hydrogen, hydrocarbyl, substituted hydrocarbyl, hydroxy, halo, phospho (—$PO_3H$), or sulfo (—$SO_3H$), and "*" designates the point of attachment of the $A^2$ ring system to the remainder of the repeat unit. In another embodiment, the $A^2$ ring system is a benzobisazole of Formula 4A or Formula 5A, or a heterocyclobisazole of Formula 4B, 4C, 4D, 5B, 5C or 5D:

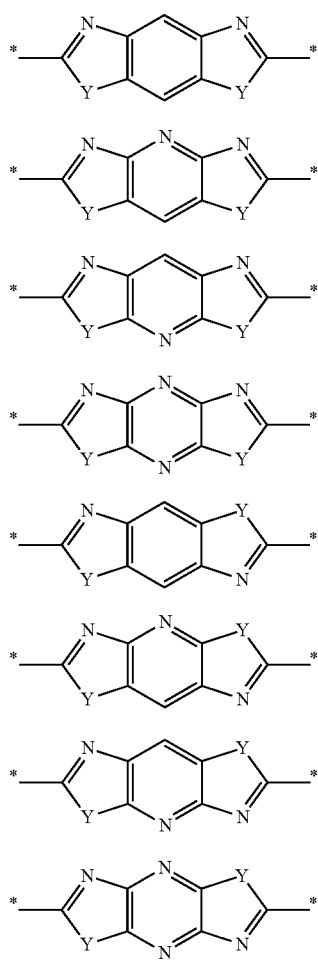

Formula 4A

Formula 4B

Formula 4C

Formula 4D

Formula 5A

Formula 5B

Formula 5C

Formula 5D wherein Y is —O—, —S— or —NR', R' is hydrogen, hydrocarbyl, substituted hydrocarbyl or acyl, and "*" designates the point of attachment of the ring system of Formula 4A, 4B, 4C, 4D, 5A, 5B, 5C or 5D to the remainder of the repeat unit. By way of further example, in another embodiment $X_1$ and $X_2$ are independently optionally substituted para-ordered arylene or optionally substituted para-ordered heterocycle corresponding to Formula 3.

In one embodiment in which the polymer composite comprises a homopolymer or a copolymer containing rigid rod polymer repeat units corresponding to Formula 2I, 2J, 2K, or 2L, $X_1$ and one of the R' substituents combine to form a fused heterocyclic ring stem and the other R' is acyl whereby the repeat unit is ladder repeat unit. One such repeat unit is the benzamidazobenzophenanthroline ("BBL") repeat unit corresponding to Formula 6

Formula 6

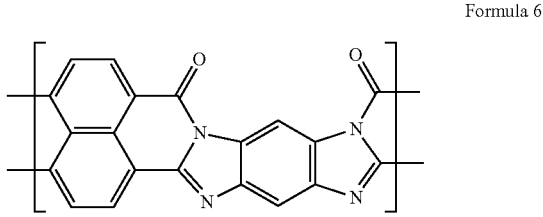

as described in U.S. Pat. No. 3,632,414, incorporated by reference herein in its entirety.

Examples of benzobisazole polymers comprised by the polymer-composite include para-ordered heterocyclic polymer having repeat group of the formula

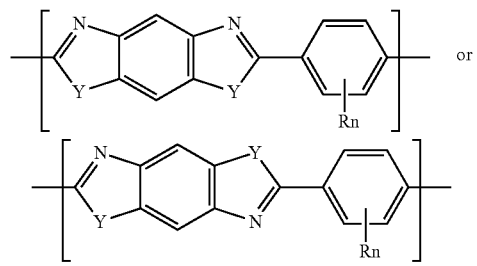

or

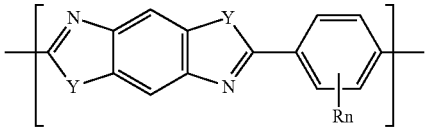

where Y is —S—, n is 1 or 2, and R is a hydroxyl group, a sulfo group or an alkyl group having 1 to 4 carbon atoms.

Other examples of rigid rod polymers comprised by the polymer composite include benzimidazole polymers and copolymers comprising repeat units of the formula

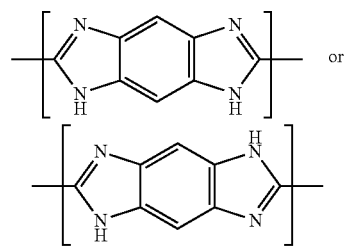

or

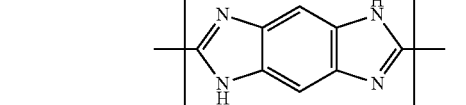

and include p-phenylenebenzimidazole (PBI) comprising repeat units of the formula

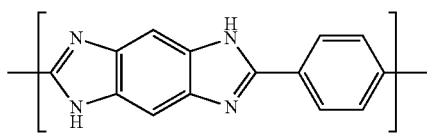

Such polymers and copolymers are described in U.S. Pat. No. 3,901,855 and incorporated by reference herein in its entirety.

Further examples of benzobisazole polymers comprised by the polymer composite are polybenzobisoxazole polymers and copolymers comprising repeat units of the formula

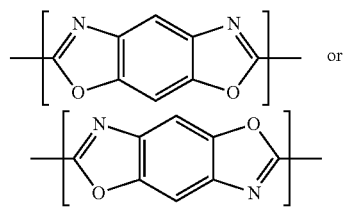

or and include polymers and copolymers of p-phenylenebenzobisoxazole (PBO) comprising repeat units of the formula

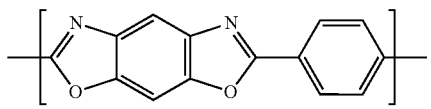

Further examples of benzobisazole polymers comprised by the polymer composite are polybenzobisthiazole polymers and copolymers comprising repeat units of the formula

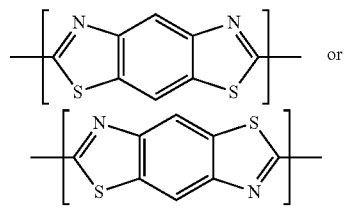

or and include polymers and copolymers of p-phenylenebenzobisthiazole (PBZT) comprising repeat units of the formula

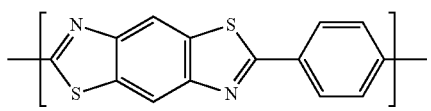

both described in U.S. Pat. No. 4,533,693, incorporated by reference herein in its entirety.

Further examples of benzobisazole polymers comprised by the polymer composite are those p-phenylenebenzobisazole polymers and copolymers containing pendant substituents on the phenylene group, including phenylenebenzobisazoles with pendant hydroxyl groups, such as dihydroxyphenylene-benzobisoxazole (Di-OH PBO), comprising repeat units of the formula

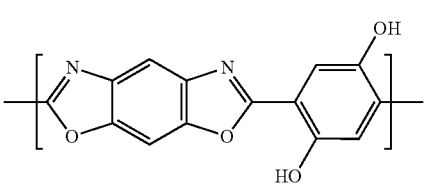

dihydroxy-phenylenebenzobisthiazole (Di-OH PBZT), comprising repeat units of the formula

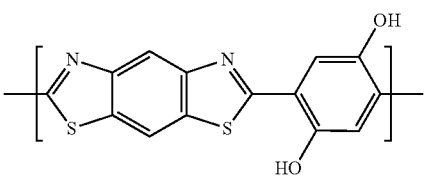

dihydroxy-phenylenebenzobisimidazole (Di-OH PBI) comprising repeat units of the formula

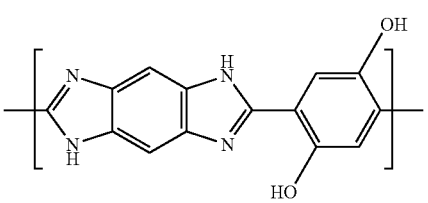

described in U.S. Pat. Nos. 5,041,522 and 5,039,778, each incorporated by reference herein in its entirety, and dihydroxy-phenylenepyridobisimidazole (Di-OH PPBI) comprising repeat units of the formula

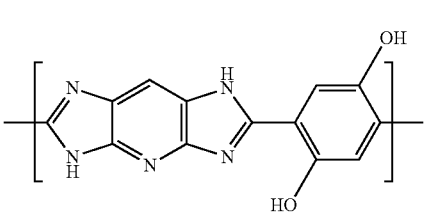

described in U.S. Pat. No. 5,674,969, incorporated by reference herein in its entirety.

Further examples of polymers comprised by the polymer composite include phenylenebenzobisazoles having pendant sulfonic acid groups, such as sulfo-phenylenebenzobisoxazole (sulfo-PBO) comprising repeat units of the formula

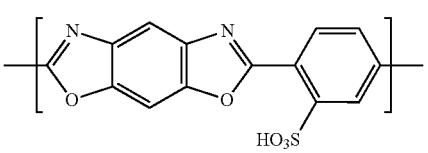

sulfo-phenylenebenzobisimidazole (sulfo-PBI) comprising repeat units of the formula

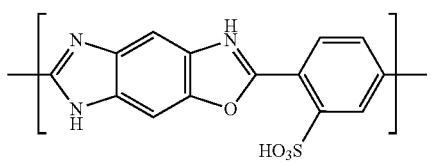

and sulfo-phenylenebenzobisthiazole (sulfo-PBZT) comprising repeat units of the formula

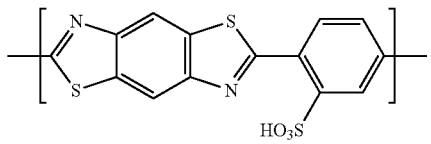

described in U.S. Pat. Nos. 5,312,876 and 5,312,895, each incorporated by reference herein its entirety. Also included are phenylenebenzobisazole polymers with pendant methyl groups, such as methyl- and dimethyl-phenylenebenzobisoxazole (Me-PBO) comprising repeat units of formula

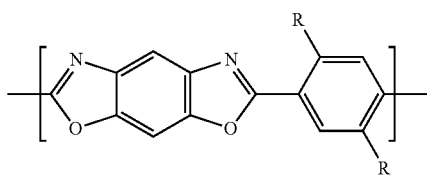

wherein R and R' are each hydrogen or methyl one of R and R' is hydrogen and the other is methyl or R and R' are each methyl. Also included are methyl- or dimethyl-phenylenebenzobisthiazole (Me-PBZT), comprising repeal units of the formula

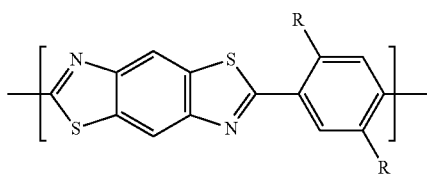

wherein R and R' are each hydrogen or methyl one of R and R' is hydrogen and the other is methyl or R and R' are each methyl. Also included are methyl- and dimethyl-phenylenebenzobisimidazole (Me-PBI), comprising repeat units of the formula

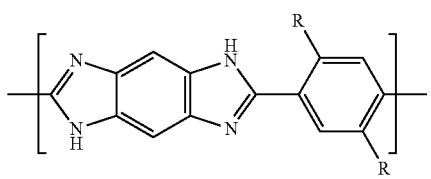

where in R and R' are each hydrogen of methyl, one of R and R' is hydrogen and the other is methyl or R and R' are each methyl as described in U.S. Pat. Nos. 5,001,217, 5,098,988, and 5,136,012, each incorporated by reference herein in its entirety.

In some embodiments, the polymer comprised by the polymer composite is a rigid rod copolymer comprising rigid rod polymer repeat units and extended rod polymer repeat units. Exemplary rigid rod polymers comprising rigid rod polymer repeat units and extended rod polymer repeat units include, but are not limited to, polymers and copolymers having extended rod polymer repeat units of the formula

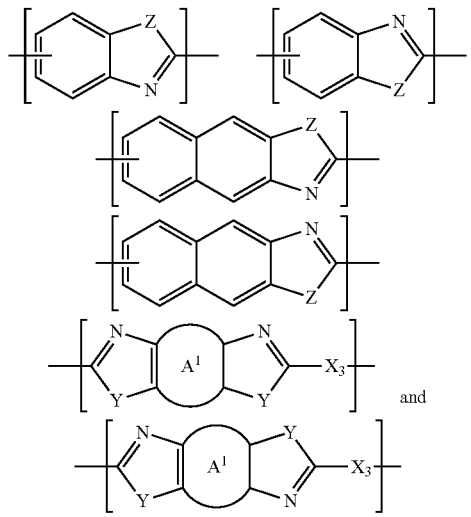

wherein the $A^1$ ring is a six-membered aromatic or a six-membered heterocyclic ring, Y is —O—, —S— or —NR', R' is hydrogen, hydrocarbyl, substituted hydrocarbyl or acyl, $X^3$ is an imidazole, pyrazole or thiopene ring, and Z is selected from the group consisting of —NR", S, and O, and R" is hydrogen, hydrocarbyl, or substituted hydrocarbyl or acyl. For example, in one embodiment, R" is hydrogen or phenyl. Exemplary extended rod polymer repeat units include the following repeat units

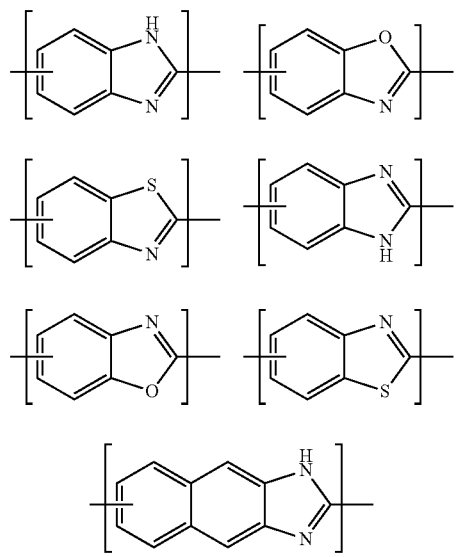

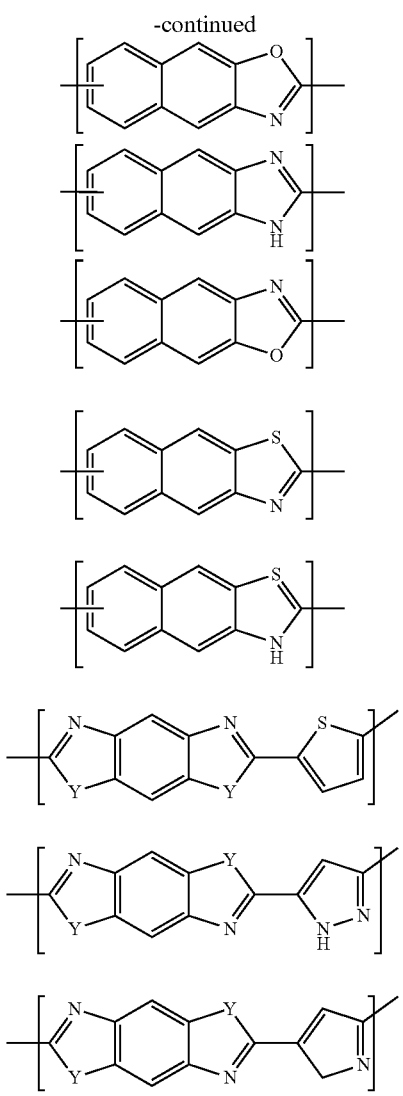

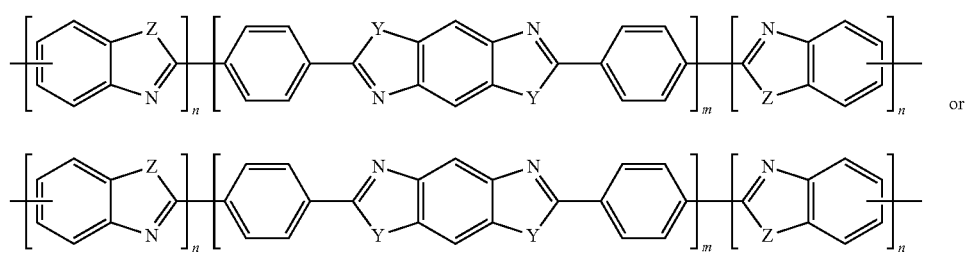

wherein Y is —O—, —S— or —NR', R' is hydrogen, hydrocarbyl, substituted or hydrocarbyl.

Such extended rod copolymers may be polymerized in situ in the presence of the rigid rod polymers generally described in Formulae 1 and 2 above to produce an aromatic heterocyclic block copolymer having rigid and extended rod segments of the general formula wherein Y and Z are the same or different and are selected from the group consisting of —S—, —O—, and —NR$_2$, each R$_2$ is independently hydrogen, hydrocarbyl, substituted hydrocarbyl, hydroxy, halo, phospho (—PO$_3$H), or sulfo (—SO$_3$H); m is an integer equal to the number of repeat units of the rigid segment and n is an integer equal to the repeat units of the extended rod segments. In one exemplary embodiment at least one of Y and Z is —NR$_2$ and R$_2$ is hydrogen or phenyl. The method of preparation of the aromatic heterocyclic copolymer is described in U.S. Pat. No. 4,544,713, incorporated by reference herein in its entirety. In general, and relative to a homopolymer of the corresponding rigid rod polymer repeat units, the block copolymer may have an increased elongation to break property, and/or increased solubility in the acid solvents.

Another example of block copolymers comprised by the polymer composite include aromatic heterocyclic block copolymers having rigid and extended rod segments of the general formula

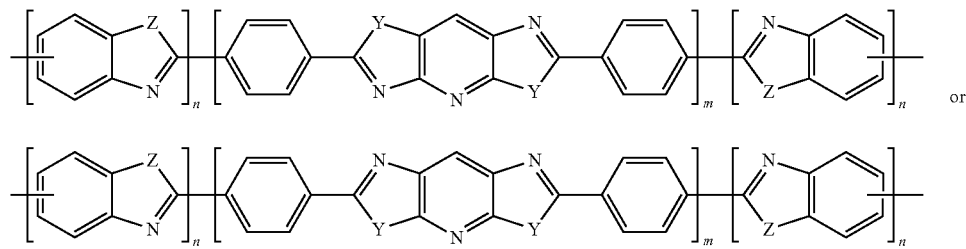

or wherein Y and Z are the same or different and are selected from the group consisting of —S'—, —O—, and —NR$_2$, each R$_2$ is independently hydrogen, hydrocarbyl, substituted hydrocarbyl, hydroxy, halo, phospho (—PO$_3$H), or sulfo (—SO$_3$H); m is an integer equal to the number of repeat units of the rigid segment and n is an integer equal to the repeat units of the extended rod segments. In one exemplary embodiment, at least one of Y and Z is —NR$_2$ and R$_5$ is hydrogen or phenyl.

Other examples of aromatic heterocyclic block copolymers having rigid and extended rod segments includes copolymers of the formula

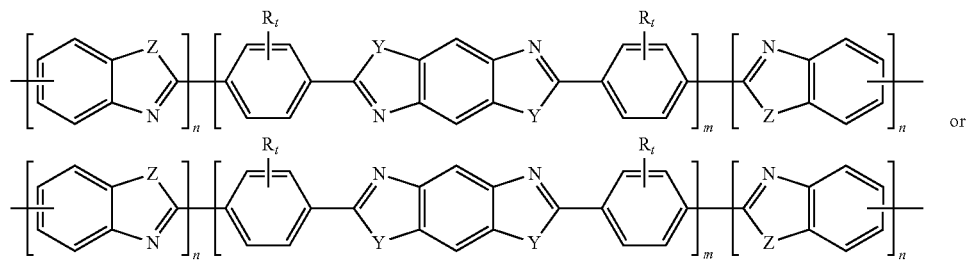

or wherein Y and Z are the same or different and are selected from the group consisting of —S—, —O—, and —NR$_2$, m is an integer equal to the number of repeat units of the rigid segment, n is an integer equal to the repeat units of the extended rod segments, R is hydroxy, sulfo (—SO$_3$H), or an alkyl group having 1 to 4 carbon atoms, each R$_2$ is independently hydrogen, hydrocarbyl, substituted hydrocarbyl, hydroxy, halo, phospho (—PO$_3$H), or sulfo (—SO$_3$H) and t is 1-4. In one exemplary embodiment, at least one of Y and Z is —NR$_2$ and R$_2$ is hydrogen or phenyl.

Another example of aromatic heterocyclic block copolymers having rigid and extended rod segments includes copolymers of the general formula

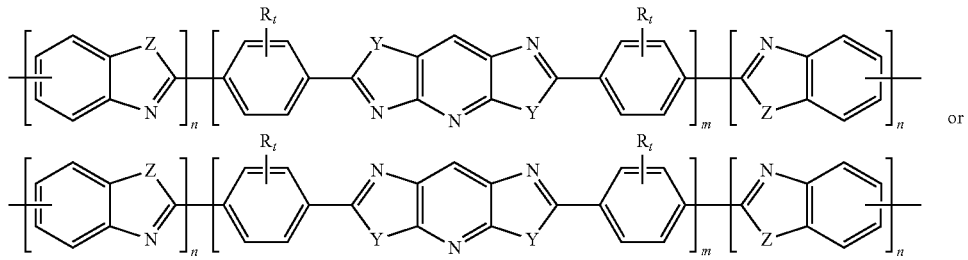

wherein Y and Z are the same or different and are selected from the group consisting of —S—, —O—, and —NR$_2$, m is an integer equal to the number of repeat units of the rigid segment, n is an integer equal to the repeat units of the extended rod segments, R is hydroxy, sulfo (—SO$_3$H), or an alkyl group having 1 to 4 carbon atoms each R$_2$ is independently hydrogen, hydrocarbyl, substituted hydrocarbyl, hydroxy, halo, phospho (—PO$_3$H), or sulfo (—SO$_3$H) and t is 1-4. In one exemplary embodiment, at least one of Y and Z is —NR$_2$ and R$_2$ is hydrogen or phenyl, Other examples of the aromatic heterocyclic block copolymers having rigid rod and extended rod segments includes copolymers of the general formates.

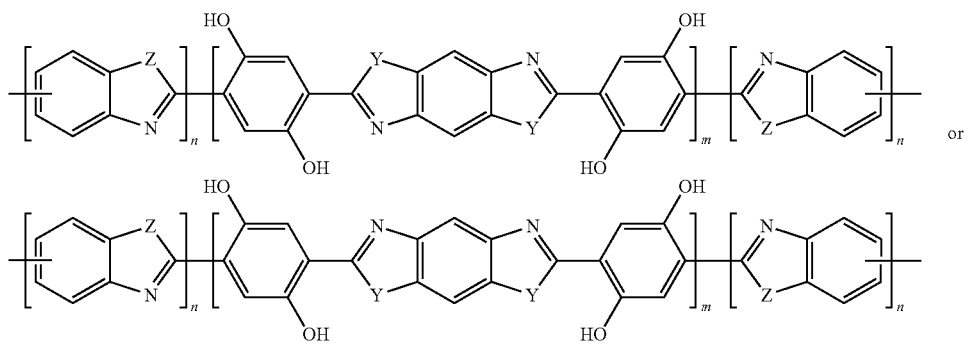

wherein Y and Z are the same or different and are selected from the group consisting of —S—, —O—, and —NR$_2$; m is an integer equal to the number of repeat units of the rigid segment, n is an integer equal to the repeat units of the extended rod segments, and each R$_2$ is independently hydrogen, hydrocarbyl, substituted hydrocarbyl, hydroxy, halo, phospho (—PO$_3$H), or sulfo (—SO$_3$H). In one exemplary embodiment, at least one of Y and Z is —NR$_2$ and R$_2$ is hydrogen or phenyl.

Other aromatic heterocyclic block copolymers having rigid rod and extended rod segments includes copolymers of the general formulas

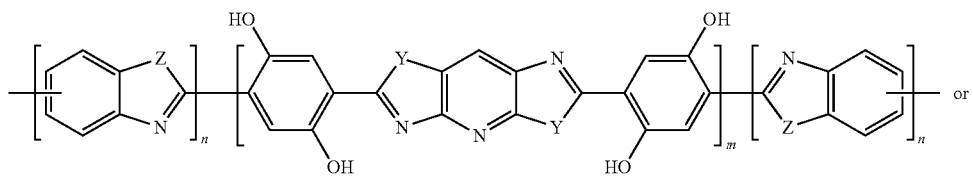

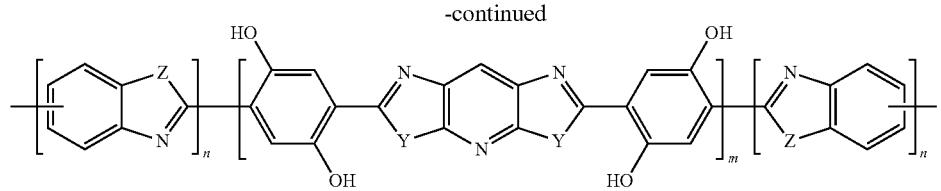

wherein Y and Z are the same or different and are selected from the group consisting of —S—, —O—, and —NR$_2$; m is an integer equal to the number of repeat units of the rigid segment, and n is an integer equal to the repeat units of the extended rod segments, and each R$_2$ is independently hydrogen, hydrocarbyl, substituted hydrocarbyl, hydroxy, halo, phospho (—PO$_3$H), or sulfo (—SO$_3$H). In one exemplary embodiment, at least one of Y and Z is —NR$_2$ and R$_2$ is hydrogen or In another embodiment, the polymer of the polymer composite may further comprise a non-extended/rigid rod polymer or polymer segment incorporated through step-growth polymerization. The non-extended/rigid rod polymer or polymer segment may constitute up to 25 wt % of the polymer component of the polymer composite. In one exemplary embodiment, the non-extended/rigid rod polymer is a homopolymer or a copolymer composing the residues of two or more monomers having repeat units that differ from other polymers or other polymer segments in the polymer composite. By way of further example, the non-extended/rigid rod polymer is a condensation polymer. By way of further example, the non-extended/rigid rod polymer is a condensation polymer selected from the group of polysulfide, polyether, polyester, or polyamide. By way of further example, the non-extended/rigid rod polymer is polyepoxide or poly-paraphenylene terephthalamide (Kevlar™). In a preferred embodiment, the additional polymer may be sheet-like to permit pooling in solution. Thus, for example, in one embodiment the polymer of the polymer composite comprises a blend of a rigid rod polymer and a non-extended/ rigid rod polymer. In another embodiment, the polymer of the polymer composite is a block copolymer with at least one of the segments of the copolymer comprising non-extended/rigid rod polymer repeat units. In general, when the non-extended/rigid rod polymer comprises a blend of a rigid rod polymer and a non-extended/rigid rod polymer, the non-extended/rigid rod polymer will constitute less than 25 wt % of such blend. For example, in one embodiment the non-extended/rigid rod polymer will constitute less than 20 wt % of such a blend. By way of further example, the non-extended/rigid rod polymer will constitute less than 15 wt % of such a blend. By way of further example, the non-extended/rigid rod polymer will constitute less than 10 wt % of such a blend. By way of further example, the non-extended/rigid rod polymer will constitute less than 5 wt % of such a blend. Similarly, when the non-extended/ rigid rod polymer is a block copolymer with at least one of the segments of the copolymer comprising non-extended/ rigid rod polymer repeat units, the non-extended/rigid rod polymer repeat units will constitute less than 25 wt % of the copolymer. In some embodiments, the non-extended/rigid rod polymer repeat units will constitute less than 20 wt % of the copolymer. In some embodiment, the non-extended/rigid rod polymer repeat units will constitute less than 15 wt % of the copolymer. In some embodiments, the non-extended/ rigid rod polymer repeat units will constitute less than 10 wt % of the copolymer. In some embodiments, the non-extended/rigid rod polymer repeat units will constitute less than 5 wt % of the copolymer.

In another embodiment, the polymer composite may comprise a nanoparticle other than graphene. For example, the polymer composite may comprise clay, metallic, or ceramic nanoparticles or other carbon nanoparticles such as carbon nanotubes in addition to graphene. In general, it is preferred that any additional nanoparticles be sheet-like.

Polymer Synthesis

Polymer compositions comprising graphene nanoparticles and rigid-rod polymers and copolymers may be synthesized by a range of methods. In one exemplary method, the graphene nanoparticles are dispersed (e.g., at loading of at least 50 wt %) into the polymer matrix, and by means of pi-pi interaction these planar sheets of graphene materials are pulled into the polymer. In another exemplary method, rigid-rod polymers are polymerized, in-situ, in the presence of the graphene nanoparticles. In this method, rigid rod monomers may be dissolved in a strong acid such as phosphoric acid or methanesulfonic acid and oligomerized to produce chains of about 5 to 10 rigid rod polymer repeat units on average. Graphene is then added to the oligomer-containing reaction mixture to form a polymer composite comprising a polymer and graphene nanoparticles. The in-situ polymerization may be done through the polycondensation of diamines and diacid monomers (or other suitably difunctionalized monomers) in the presence of graphene nanoparticles. As the rigid-rod polymers or copolymers polymerize, liquid crystalline domains form. The graphene nanoparticles align along the propagating rigid-rod molecules and are entrapped in the resulting dope. The resulting anisotropic alignment of the rigid-rod polymers and graphene nanoparticles appears liquid crystalline in nature; that is, the reaction mixture appears opalescent. The present invention provides a substantially uniform, aligned distribution of graphene nanoparticles that is not readily obtainable by the process of melt mixing a molten polymer with graphene nanoparticles.

Processing of the new compositions into fibers and films provides hybrid materials with vastly improved tensile properties, which are superior to the same polymers without incorporated graphene nanoparticles. Although not meaning to be limited, the polymer component of the present compositions can include various benzamidazobenzophenanthroline, benzobisazole, and pyridobisimidazole polymers and copolymers. Films and fibers of these polymers and copolymers are known for their extremely high modulus and high strength. In this invention, the rigid-rod polymers and copolymers are formed by in-situ polymerization from the polycondensation of diamine and diacidmonomers. Suitable amino-group-containing monomers include, but are not limited to: 2,5-diamino-1,4-benzenedithiol dihydrochloride, 4,6-diamino-1,3-benzenedithiol dihydrochloride, 1,2,4,5-tetraaminobenzene tetrahydrochloride, 2,3,5,6-tetraaminopyridine tetrahydrochloride, 2,5-diamino-1,4-1 dihydrochloride, and 1,4,5,8-tetraaminonaphthalene tetrahydrochloride. Suitable acid-group-containing monomers include, but are not limited to: terephthalic acid, dihydroxy-terephthalic acid, and 1,4,5,8-tetracarboxynaphthalene.

In the case of aromatic heterocyclic block copolymers, the method of this invention comprises the steps of preparing the rigid-rod polymer block by reacting a diaminomonomer and terephthalic acid (in slight excess) in polyphosphoric acid (PPA) to form a carboxy-terminated rigid rod segment, followed by addition of a copolymerizable monomer and copolymerization of the same. The rigid rod segment containing carboxy-terminated groups of the general formula

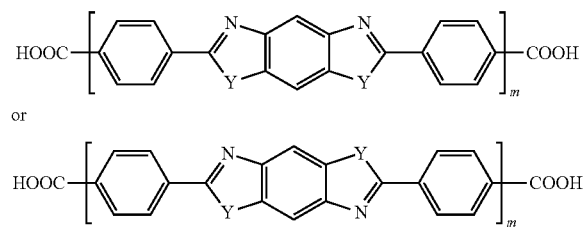

or wherein Y is or —O—, —S— or —NR', where R' is hydrogen, alkyl having 1 to 4 carbon atoms, or an aromatic group having 1 or 2 aromatic rings, and m is an integer equal to the number of repeat units of the rigid segment.

Following polymerization of the above rigid rod segment monomers, a copolymerizable monomer of the general formula

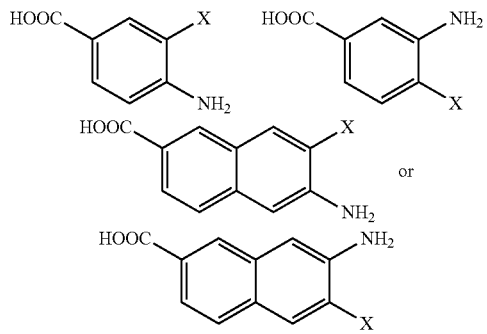

wherein X is —$NH_2$, —OH, —SH, or —$NHC_6H_5$ is added to the reaction mixture containing the rigid rod segment, and polymerization of the extended rod segments as well as grafting of these segments onto the rigid rod segments is carried out.

The in-situ polymerizations and/or copolymerizations may be conducted in any suitable medium in which the rigid-rod polymers or copolymers can be formed and maintained in solution. A suitable medium for carrying out the polycondensation polymerizations of the present invention comprises polyphosphoric acid (PPA), having a formula represented by $H_{n+2}P_nO_{3n+1}$ or $HO(PO_3H)_nH$. The polyphosphoric acid composition can be expressed in terms of the phosphorous pentoxide ($P_2O_5$) content or the phosphoric acid ($H_3PO_4$, n=1) content.

The polymer concentration in the medium preferably is selected to promote the formation of an anisotropic reaction mixture. Polymer concentrations in the range from about 5 wt % to about 20 wt % in the medium can promote an anisotropic reaction mixture. The graphene nanoparticles concentration preferably can range from about 0.1 wt % to about 70 wt % for films production and from about 1 wt % to about 50 wt % for fibers production based on the weight of polymer in the polymerization.

In the present invention, the process for making a rigid-rod polymer/graphene nanoparticles composition involves synthesizing the rigid-rod polymer or copolymer in the presence of graphene nanoparticles. In one embodiment of in-situ polymerization, stoichiometric amounts of amine hydrochloride and acid monomers are combined in 85% phosphoric acid and heated to a temperature in the range of about 60° C. to about 80° C. to effect the thermal dehydrochlorination of the amine monomer. Note that the use of amines without protective hydrochloride is also within the scope of this invention. After the dehydrochlorination is complete, the graphene nanoparticles are added. The temperature is then raised to about 100° C. and maintained for about 4 to 6 hours. The reaction temperature is cooled to about 45° C. and phosphorous pentoxide ($P_2O_5$) is added to mate 77% PPA. After the phosphorous pentoxide addition, the temperature is increased to 100° C. and maintained for about 4 hours. Additional $P_2O_5$ is then added to increase the PPA concentration to about 82 to about 84% PPA. The temperature is then raised to about 165° C. and maintained at that temperature for about 10 to 12 hours. The temperature of the reaction mixture is then raised to about 190° C. and held for about 4 hours. The procedure results in a liquid crystalline composition comprising rigid-rod liquid crystalline polymer and graphene nanoparticles that can be extruded and processed into fiber or film.

In one embodiment of in-situ copolymerization, an excess amount of acid monomers (preferably about 5 wt %) and amine hydrochloride are combined in 85% phosphoric acid and heated to a temperature in the range of about 60° C. to about 80° C. to effect the thermal dehydrochlorination of the amine monomer. Note that the use of amines without protective hydrochloride is also with the scope of this invention. After the dehydrochlorination is complete, the graphene nanoparticles are added. The temperature is then raised to about 100° and maintained for about 4 to 6 hours. The reaction temperature is cooled to about 45° C. and phosphorous pentoxide ($P_2O_5$) is added to make 77% PPA. After the phosphorous pentoxide addition, the temperature is increased to 100° C. and maintained for about 4 hours. Additional $P_2O_5$ is then added to increase the PPA concentration to about 82 to about 84% PPA. The temperature is then raised to about 165° C. and maintained at that temperature for about 5 hours with observed stir-opalescence. The viscous solution is cooled to 65° C. and the carboxy-monoamine monomer is added thereto. The resulting mixture is heated slowly under inert gas atmosphere to about 100° C. for a period of about 6 to 12 hours to effect the dehydrochlorination of the carboxy-monoamine monomer. Following the dehydrochlorination, the reaction is slowly heated back to 165° C. and maintained at that temperature for 10 to 12 hours. The temperature of the reaction is then raised to 190° C. and held for about 4 hours. The procedure results in a liquid crystalline composition comprising rigid-rod liquid crystalline copolymer and graphene nanoparticles that can be extruded and processed into fiber or film.

After each in-situ polymerization, aliquot samples are taken to determine intrinsic viscosity and also for processing into cast films. The samples are precipitated into water, treated with ammonium hydroxide, washed extensively with water, and dried under reduced pressure. After precipitating into water or redissolving of dried samples in methanesulfonic acid for intrinsic viscosity measurements, the samples show no separation of the graphene nanoparticles from the derived polymer.

The cast or aggregated films from the rigid rod polymers and copolymers/graphene nanoparticles composite, such as those based on benzobisazoles, pyridobisazoles and benzamidazobenzophenanthroline, are formed from MSA (methanesulfonic acid) solution. The added graphene nanoparticles concentration preferably can range from about 0.1 wt % to about 50 wt % based on the weight of the polymer or copolymer in MSA. Generally, the films of the present invention comprising rigid-rod polymer or copolymer/graphene nanoparticles composites have significantly higher strength and tensile properties, such as higher stiffness, tensile modulus, and strain to failure (elongation-to-break), than like polymer films without graphene nanoparticles. Certain films comprising the rigid-rod polymers/graphene nanoparticles composites of this invention have shown about 350% greater tensile strength than over films of the same polymeric composition without graphene nanoparticles. Films prepared with the compositions of this invention also show lower creep than like polymer films without graphene nanoparticles.

Fiber spinning may be done by any suitable technique. One such method is dry-jet wet spinning using a piston driven spinning system. For fiber spinning solution or dope, the added graphene nanoparticles concentration preferably can range from about 1 wt % to about 50 wt % based on the weight of the polymer or copolymer in PPA medium. The temperature the polymer or copolymer composite solution or dope preferably is maintained between about 100° C. and about 150° C. An air gap preferably is maintained in the range of about 2 cm and about 25 cm. Extruded fiber is coagulated in water at room temperature. Fiber is washed in water, dilute base, and water again for about a week or for any time sufficient to remove the acid from the fiber. The fiber is subsequently dried in vacuum at about 80° C. Dried fiber can be heat-treated in nitrogen at about 400° C. to impart higher strength and tensile properties. Generally, the fibers of the present invention comprising rigid-rod polymer/graphene nanoparticles composites have significantly higher strength and tensile properties, such as higher stiffness and strain to failure (elongation to break), than like polymer fibers without graphene nanoparticles. Certain fibers comprising the rigid-rod polymers/graphene nanoparticles composites of this invention have shown about 230% greater tensile strength than over fibers of the same polymeric composition without graphene nanoparticles. Fibers prepared with the compositions of this invention also show lower creep than like polymer fibers without graphene nanoparticles.

This composite of this invention provides a fundamental improvement in products and articles of manufacture comprising rigid-rod polymers and copolymers, and it enables new and improved articles, of manufacture, including, but not limited to composite structural materials, films, coatings and fibers requiring high tensile strength such as for high-strength fibers and structural elements of machines, buildings, and vehicles. Improved articles of manufacture incorporating fibers of the present invention include body armor, bullet-proof vests, vehicular armor, armor for structures, elements of ballistic protection systems and as reinforcing fibers for both organic and inorganic products, such as in tires, belts, ceramics, polymer laminates for aircraft and other compositions requiring high strength on the grapheme nanoparticles concentration and dispersion, additional properties of electrical or thermal conductivity, electromagnetic and radio-frequency shielding may also be realized.

EXAMPLES

The following non-limiting examples are provided to further illustrate the present invention. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example I

BBL/GS (80/20)

A composition of 20% graphene nanoparticles and 80% ladder polymer, benzimidazobenzo-phenanthroline (BBL) was prepared as follows. Into the bottom of a 250-ml resin flask equipped with a mechanical stirrer, a nitrogen inlet and outlet, was placed 5.6804 g (0.02 mol) of 1,2,4,5-tetraaminobenzene tetrahydrochloride, 6.0842 g (0.02 mol) of 1,4,5,8-naphtalenetetracarboxylic acid, and 16.16 g of phosphoric acid (85%). The resulting mixture was dehydrochlorinated under nitrogen atmosphere at 65° C. for 16 hours. The temperature was then raised to 80° C. and held for 4 hours. 1.32 g of graphene nanoparticles (chemical synthesized graphene nanoparticles from Angstrom, Inc., Dayton, Ohio) was added to the mixture. The mixture was heated at 100° C. for 16 hours and then cooled to room temperature. 10.69 g of $P_2O_5$ was added to the mixture to generate polyphosphoric acid (77% $P_2O_5$). The mixture was stirred for 2 hours at 80° C. and cooled to room temperature. 20.02 g of $P_2O_5$ was added to the mixture to bring the polymer concentration to 12%. The mixture was then heated at 160° C. for 16 hours. As the temperature increased, stir opalescence began to occur at about 160° C. The mixture was finally heated to 190° C. and held for additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 17.0 dl/g was determined in methanesulfonic acid at 30° C.

Example II

PBZT/GS (90/10)

A composition of 10% graphene nanoparticles (GS) and 90% polyphenylenebenzobisthiazole (PBZT) was prepared as follows. Into the bottom of a 250-ml resin flask equipped with a mechanical stirrer, a nitrogen inlet and outlet, was placed 4.904 g (0.02 mol) of 2,5-diamino-1,4-benzenedithiol dihydrochloride, 3.3226 g (0.02 mol) of 2,5-dihydroxyterepthalic acid, and 20.68 g of phosphoric acid (85%). The resulting mixture was dehydrochlorinated under nitrogen atmosphere at 65° C. for 16 hours. The temperature was then raised to 80° C. and held for 4 hours. 0.52 g of purified graphene nanoparticles (chemical synthesized graphene nanoparticles from Angstrom, Inc., Dayton, Ohio) was added to the mixture. The mixture was heated at 100° C. for 16 hours and then cooled the mixture to room temperature, 13.69 g $P_2O_5$ was added to the mixture to generate polyphosphoric acid (77% $P_2O_5$). The mixture was stirred for 2 hours at 80° C. and then cooled to room temperature. 12.13 g of $P_2O_5$ was added to the mixture to bring the polymer concentration to 10%. The mixture was heated at 160° C. for 16 hours. As the temperature increased, stir opalescence began to occur at about 150° C. The mixture was finally heated to 190° C. and held for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 26 dl/g was determined in methanesulfonic acid at 30° C.

Example III

PBO/GS (95/5)

A composition of 5% of graphene nanoparticles (GS) and 95% polyphenylenebenzobisoxazole (PBO) was prepared as follows. Into the bottom of a 250-ml resin flask equipped with a mechanical stirrer, a nitrogen inlet and outlet, was place 4.2612 g (0.02 mol) of 1,4-diaminoresorcinol dihydrochloride, 4.0605 g (0.02 mol) of terephthaloyl chloride, and 12.14 g of phosphoric acid (85%). The resulting mixture dehydrochlorinated under nitrogen atmosphere at 65° C. for 16 hours. The temperature was then raised to 80° C. and held for 4 hours. 0.23 g of purified graphene nanoparticles (chemical synthesized graphene nanoparticles from Angstrom, Inc., Dayton, Ohio) was added to the mixture. The mixture was heated at 100° C. for 16 hours and then cooled to room temperature. 8.04 g of $P_2O_5$ was added to the mixture to generate polyphosphoric acid (77% $P_2O_5$). The mixture was stirred for 2 hours at 80° C. and then cooled to room temperature. 7.15 g of $P_2O_5$ was added to the mixture to bring the polymer concentration to 14%. The mixture was heated at 160° C. for 16 hours. As the temperature increased, stir opalescence began to occur at about 155° C. The mixture was finally heated to 190° C., for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 18 dl/g was determined in methanesulfonic acid, at 30° C.

Example IV

Di-OHPBO/GS (90/10)

A composition of 10% graphene nanoparticles and 90% 2,5-dihydroxy-polyphenylenebenzobisoxazole (2,5-Di-OH PBO) was prepared as follows. Into the bottom of a 250-ml resin flask equipped with a mechanical stirrer, a nitrogen inlet and outlet, was placed 4.2612 g (0.02 mol) of 1,4-diaminoresorcinol dihydrochloride, 4.7004 g (0.02 mol) of 2,5-dihydroxyterephthaloyl chloride, and 12.14 g of phosphoric acid (85%). The resulting mixture was dehydrochlorinated under nitrogen atmosphere at 65° C. for 16 hours. The temperature was then raised to 80° C. and held for 4 hours. 0.47 g of graphene nanoparticles (chemical synthesized graphene nanoparticles from Angstrom, Inc., Dayton, Ohio) was added to the mixture. The mixture was heated at 100° C. for 16 hours and then cooled the mixture to room temperature. 9.14 g of $P_2O_5$ was added to the mixture to generate polyphosphate acid (77% $P_2O_5$). The mixture was stirred for 2 hours at 80° C. and then cooled to room temperature. 8.13 g of $P_2O_5$ was added to the mixture to bring the polymer concentration to 14%. The mixture was heated at 160° C. for 16 hours. As the temperature increased, stir opalescence began to occur at about 155° C. The mixture was finally heated to 190° C. and held for an additional 4 hours.

No graphene nanoparticles aggregates were observed in optical micrographs taken of the 2,5-Di-OH PBO/GS dope under cross polarizers, indicating good nanosheets dispersion at the optical scale during 2,5-Di-OH PBO polymerization. An aliquot of the polymer dope was precipitated in water, broken up with a blender, collected by suction filtration, washed with water and dried under reduced pressure (0.02 mmHg) at 100° C. for 24 hours. An intrinsic viscosity of 17 dl/g was determined in methanesulfonic acid, at 30° C.

Example V

PBO/GS(80/20)

A composition of 2.0% graphene nanoparticles and 80% polyphenylenebenzobisoxazole (PBO) was prepared as follows. Into the bottom of a 250-ml resin flask equipped with a mechanical stirrer, a nitrogen inlet and outlet, was placed 4.2612 g (0.02 mol) of 1,4-diaminoresorcinol dihydrochloride, 4.0605 g (0.02 mol) of terephthaloyl chloride, and 16.87 g of phosphoric acid (85%). The resulting mixture was dehydrochlorinated under nitrogen atmosphere at 65° C. for 16 hours. The temperature was then raised to 80° C. and held for 4 hours, 0.94 g of graphene nanoparticles (chemical synthesized graphene nanoparticles from Angstrom, Inc., Dayton, Ohio) was added to the mixture. The mixture was heated at 100° C. for 16 hours and then cooled to room temperature. 11.16 g of $P_2O_5$ was added to the mixture to generate polyphosphoric acid (77% $P_2O_5$). The mixture was stirred for 2 hours at 80° C. and then cooled to room temperature, 13.4 g of $P_2O_5$ was added to the mixture to bring the polymer concentration to 10%. The mixture was heated at 160° C. for 16 hours. As the temperature increased, stir opalescence began to occur at about 155° C. The mixture was finally heated to 190° C. and held for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 15 dl/g was determined in methanesulfonic acid, at 30° C.

Example VI

PBO Control

Polyphenylenebenzobisoxazo (PBO) was prepared as follows. Into the bottom of a 250-ml resin flask equipped with a mechanical stirrer, a nitrogen inlet and outlet, was placed 4.2612 g (0.02 mol) of 1,4-diaminoresorcinol dihydrochloride, 4.0605 g (0.02 mol) of terephthaloyl chloride, and 16.87 g of phosphoric acid (85%). The resulting mixture was dehydrochlorinated under nitrogen atmosphere at 65° C. for 16 hours. The temperature was then raised to 80° C. held for 4 hours. The mixture was then healed 100° C. for 16 hours and then cooled to room temperature. 11.16 g of $P_2O_5$ was added to generate polyphosphate acid (77% $P_2O_5$). The mixture was stirred for 2 hours at 80° C. and cooled to room temperature. 13.4 g of $P_2O_5$ was added to bring the polymer concentration to 10%. The polymer mixture was heated at 160° for 16 hours. As the temperature increased, stir opalescence began to occur at about 155° C. The mixture was finally heated to 190° C. and held for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 22 dl/g was determined in methanesulfonic acid at 30° C.

Example VII

Di-OH PBI/GS (95/5)

A composition of 5% graphene nanoparticles (GS) and 95% 2,5-dihydroxy-phenylenebenzobisimidazole (Di-OH-PBI) was prepared as follows. Into the bottom of a 250-ml resin flask equipped with a mechanical stirrer, a nitrogen inlet and outlet, was placed 5.6804 g (0.02 mol) of 2,3,5,6-tetraaminobenzene-terahydrochloride, 4.7004 g (0.02 mol) of 2,5-dihydroxyterephthaloyl chloride, and 11.66 g of phosphoric acid (85%). The resulting mixture was dehydrochlorinated under nitrogen atmosphere at 65° C. for 16 hours. The temperature was then raised to 80° C. and held for 4 hours. 0.26 g of graphene nanoparticles (chemical synthesized graphene nanoparticles from Angstrom, Inc., Dayton, Ohio) was added to the mixture. The mixture was heated at 100° C. for 16 hours and then cooled to room temperature. 7.71 g of $P_2O_5$ was added to the mixture to generate polyphosphate acid (77% $P_2O_5$). The mixture was stirred for 2 hours at 80° C. and then cooled to room temperature. 12.14 g of $P_2O_5$ was added to the mixture to bring the polymer concentration to 14%. The mixture was heated at 165° C. for 16 hours. As the temperature increased, stir opalescence began to occur at about 158° C. The mixture was finally heated to 190° C. and held for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 18 dl/g was determined in methanesulfonic acid at 30° C.

Example VIII

Di-OHPPBI/GS (95/5)

A composition of 5% graphene nanoparticles and 95% polydihydroxyphenylenepyridobisimidazole (Di-OHPPBI) was prepared as follows. Into the bottom of a 250-ml resin flask equipped with a mechanical stirrer and a nitrogen inlet/outlet was placed 5.3310 g (0.02 mol) of 2,3,5,6-tetraaminopyridine-trihydrochloride-monohydrate, 4.7004 g (0.02 mol) of 2,5-dihydroxyterephthaloyl chloride, and 11.66 g of phosphoric acid (85%). The resulting mixture was dehydrochlorinated under nitrogen atmosphere at 65° C. for 16 hours. The temperature was then raised to 80° C. and held for 4 hours, 0.26 g of purified graphene nanoparticles (chemical synthesized graphene nanoparticles from Angstrom, Inc., Dayton, Ohio) was added to the mixture. The mixture was heated at 100° C. for 16 hours and then cooled to room temperature. 7.71 g of $P_2O_5$ was added to the mixture to generate polyphosphoric acid (77% $P_2O_5$). The mixture was then stirred for 2 hours at 80° C. and cooled to room temperature. 12.14 g of $P_2O_5$ was added to the mixture to bring the polymer concentration to 14%. The mixture was then heated at 165° C. for 16 hours. As the temperature increased, stir opalescence began to occur at about 158° C. The mixture was finally heated to 190° C. and held for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 19.0 dl/g was determined in methanesulfonic acid at 30° C.

Example IX

Di-OHPBI/GS (80/20)

A composition of 20% graphene nanoparticles (GS) and 80% 2,5-dihydroxy-phenylenebenzobisimidazole (Di-OH-PBI) was prepared as follows. Into the bottom of a 250-ml resin flask equipped with mechanical stirrer, a nitrogen inlet and outlet, was placed 5.6804 g (0.02 mol) of 2,3,5,6-tetraaminopyridine-trihydrochloride-monohydrate, 4.7004 g (0.02 mol) of 2,5-dihydroxyterephthaloyl chloride, and 11.66 g of phosphoric acid (85%). The resulting mixture was dehydrochlorinated under nitrogen atmosphere at 65° C. for 16 hours. The temperature was then raised to 80° C. and held for 4 hours, 1.04 g of graphene nanoparticles (chemical synthesized graphene nanoparticles from Angstrom, Inc., Dayton, Ohio) was added to the mixture. The mixture was heated at 100° C. for 16 hours and then cooled to room temperature. 7.71 g of $P_2O_5$ was added to the mixture to generate polyphosphoric acid (77% $P_2O_5$). The mixture was stirred for 2 hours at 80° C. and then cooled to room temperature. 12.14 g of $P_2O_5$ was added to the mixture to bring the polymer concentration to 14%. The mixture was heated at 165° C. for 16 hours. As the temperature increased, stir opalescence began to occur at about 158° C. The mixture was finally heated to 190° C. and held for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 15.5 dl/g was determined in methanesulfonic acid at 30° C.

Example X

BBL Control

A ladder polymer, benzimidazobenzophenanthroline (BBL) was prepared as follows. Into the bottom of a 250-ml resin flask equipped with a mechanical stirrer, a nitrogen inlet and outlet, was placed 5.6804 g (0.02 mol) of 1,2,4,5-tetraaminobenzene tetrahydrochloride, 6.0842 g (0.02 mol) of 1,4,5,8-naphthalenetetracarboxylic acid, and 16.16 g of phosphoric acid (85%). The resulting mixture was dehydrochlorinated under nitrogen atmosphere at 65° C. for 16 hours. The temperature was then raised to 80° C. and held for 4 hours. The mixture was heated at 100° C. for 16 hours and then cooled to room temperature. 10.69 g of $P_2O_5$ was added to the mixture to generate polyphosphoric acid (77% $P_2O_5$). The mixture was stirred for 2 hours at 80° C. and cooled to room temperature. 20.02 g of $P_2O_5$ was added to the mixture to bring the polymer concentration to 12%. The mixture was then heated at 160° C. for 16 hours. As the temperature increased, stir opalescence began to occur at about 160° C. The mixture was finally heated to 190° C. and held for additional 4 hours. An aliquot of the polymer dope was precipitated in water, broken up with a blender, collected by suction titration, washed with water and dried under reduced pressure (0.02 mmHg) at 100° C. for 24 hours. An intrinsic viscosity of 23.0 dl/g was determined in methanesulfonic acid at 30° C.

Example XI

ABPBI-PBO-ABPBI/GS (90/10)

Poly(2,5-benzimidazole)-block-poly(2,5-dihydroxy-1,4-phenylenebenzobisthiazole)-block-poly(2,5-benzimidazole) (ABPBI-DiOHPBO-ABPBI) was prepared as follows. Into the bottom of a 250-ml resin flask equipped with a mechanical stirrer, a nitrogen inlet and outlet, was placed 4.2612 g (0.02 mol) of 1,4-diaminoresorcinol dihydrochloride, 4.0605 g (0.021 mol) of terephthaloyl chloride, and 16.87 g of phosphoric acid (86%). The resulting mixture was dehydrochlorinated under nitrogen atmosphere at 65° C. for 16 hours. The temperature was then raised to 80° C. and held for 4 hours, 0.46 g of purified graphene nanoparticles (chemical synthesized graphene nanoparticles from Angstrom, Inc., Dayton, Ohio) was added to the mixture. The mixture was then heated at 100° C. for 16 hours and then cooled to room temperature. 11.16 g of $P_2O_5$ was added to generate polyphosphate acid (77% $P_2O_5$). The mixture was stirred for 2 hours at 80° C. and cooled to room temperature. 13.4 g of $P_2O_5$ was added to bring the polymer concentration to 10%. The polymer mixture was heated at 160° C. for 5 hours. As the temperature increased, stir opalescence began to occur at about 155° C. The viscous solution was cooled to 65° C. and 0.52 g (0.0027 mol) of 3,4-diaminobenzoic acid monohydrochloride was added. The resulting mixture is heated slowly under inert gas atmosphere to about 100° C. for a period of about 6 hours to effect the dehydrochlorination. Following the dehydrochlorination, the reaction was slowly heated back to 165° C. and maintained at that temperature for 10 to 12 hours. The mixture was finally heated to 190° C. and held for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 16 dl/g was determined in methanesulfonic acid at 30° C.

Example XII

ABPBI-PBO-ABPBI Control

Poly(2,5-benzimidazole)-block-poly(2,5-dihydroxy-1,4-phenylenebenzobisthiazole)-block-poly(2,5-benzimidazole) (ABPBI-DiOHPBO-ABPBI) was prepared as follows. Into the bottom of a 250-ml resin flask equipped with a mechanical stirrer, a nitrogen inlet and outlet, was placed 4.2612 g (0.02 mol) of 1,4-diaminoresorcinol dihydrochloride, 4.0605 g (0.021 mol) of terephthaloyl chloride, and 16.87 g of phosphoric acid (85%). The resulting mixture was dehydrochlorinated under nitrogen atmosphere at 65° C. for 16 hours. The temperature was then raised to 80° C. and held for 4 hours. The mixture was then heated at 100° C. for 16 hours and then cooled to room temperature. 11.16 g of $P_2O_5$ was added to generate polyphosphoric acid (77% $P_2O_5$). The mixture was stirred for 2 hours at 80° C. and cooled to room temperature. 13.4 g of $P_2O_5$ was added to bring the polymer concentration to 10%. The polymer mixture was heated at 160° C. for 5 hours. As the temperature increased, stir opalescence began to occur at about 155° C. The viscous solution was cooled to 65° C. and 0.52 g (0.0027 mol) of 3,4-diaminobenzoic acid monohydrochloride was added. The resulting mixture is heated slowly under inert gas atmosphere to about 100° C. for a period of about 6 hours to effect the dehydrochlorination. Following the dehydrochlorination, the reaction was slowly heated back to 165° C. and maintained at that temperature for 10 to 12 hours. The mixture was finally heated to 190° C. and held for an additional 4 hours. An aliquot of the polymer dope was precipitated in water, broken up with a blender, collected by suction filtration, washed with water and dried under reduced pressure (0.02 mmHg) at 100° C. for 24 hours. An intrinsic viscosity of 20.5 dl/g was determined in methanesulfonic acid at 30° C.

Example XIII

Preparation of BBL/GS Composite Film (50/50)

To prepare the nanocomposites, 0.5 g of graphene was first dispersed in 20 ml of methane sulfonic acid by stirring for 24 hours. 0.5 g of ladder polymer, BBL prepared according to the procedure X was added to the mixture and stirred for another 24 hours. The resulting mixture was slowly precipitated into 1 L of stirring methanol. The composite suspension in methanol was filtered through a 600 mL fine fritted funnel. A freestanding, aggregated film was formed on the surface of the funnel and was washed extensively until free of residue acid. The film was removed after air-dried for 24 hours and vacuum-dried for several days in the 100-130° C. range.

Example XIV

BBL/GS (80/20) Fiber Formation

Fibers of the polymer composition of 20% graphene nanoparticles (GS) and 80% BBL as made by the procedure in Example I, were dry-jet wet spun using a piston driven spinning system manufactured by Bradford University Research Ltd. The polymer dope was first preheated to 50° C. for about 15 minutes. The polymer dope was then formed into a cylindrical shape under dry nitrogen and transferred to the spinning cylinder. The polymer composition was heated at 100° C. for about five hours before spinning. A 50-.mu.m stainless steel filter (from Anderson Wire Works, Inc.) filter was used in-line for fiber spinning and the spinneret diameter was 250 .mu.m. A 30-mm spinning cylinder was used with a 28-mm diameter piston. The length of the air gap was 10 cm and length of the coagulation bath was 75 cm. Spun fiber was washed in water, dilute ammonia, then water for one week, vacuum dried at 80° C. for 12 hours and subsequently heat-treated in a Thermolyne 21100 tube furnace at 400° C. in nitrogen under tension for 2 minutes.

Example XV

ABPBI-PBO-ABPI/GS(90/10) Fiber Formation

Fiber formation with the polymer composition of 10% graphene nanoparticles (GS) and 90% ABPBI-PBO-ABPBI, as made by the procedure in Example XI, was dry-jet wet spinning with a piston driven spinning system manufactured by Bradford University Research Ltd. The polymer dope was then formed into a cylindrical shape under dry nitrogen and transferred to the spinning cylinder. The polymer composition was heated at 100° C. for about five hours before spinning. A 50-.mu.m stainless steel filter (from Anderson Wire Works, Inc.) fitter was used in-line for fiber spinning and the spinneret diameter was 250 .mu.m, A 30-mm spinning cylinder was used with a 28-mm diameter piston. The length of the air gap was 10 cm and length of the coagulation bath was 75 cm. Spun fiber was washed in water, dilute ammonia, then water for one week, vacuum dried at 80° C. for 12 hours and subsequently heat-treated in a Thermolyne 21100 tube furnace at 400° C. in nitrogen under tension for 2 minutes.

Example XIV

ABPBI-PBO-PBI Control Fiber Formation

Fibers of poly(2,5-benzimidazole)-block-poly(2,5-dihydroxy-1,4-phenylenebenzobisthiazole)-block-poly(2,5-benzimidazole) (ABPBI-DiOHPBO-ABPBI), as made by the procedure in Example XII, were dry-jet wet spun using a piston driven spinning system manufactured by Bradford University Research Ltd. The polymer dope was first preheated to 50° C. for about 15 minutes. The polymer dope was then formed into a cylindrical shape under dry nitrogen and transferred to the spinning cylinder. The polymer was heated at 100° C. for about five hours before spinning. A 50-.mu.m stainless steel filter (from Anderson Wire Works, Inc.) was used in-line for fiber spanning and the spinneret diameter was 250 .mu.m. A 30-mm spinning cylinder was used with a 28-mm diameter piston. The length of the air gap was 10 cm and length of the coagulation bath was 75 cm. Spun fiber was washed in water, dilute ammonia, and water for one week, vacuum dried at 80° C. for 12 hours and subsequently heat-treated in a Thermolyne 21100 tube furnace at 400° C. in nitrogen under tension for 2 minutes.

Example XV

Fiber Testing

Tensile modulus, tensile strength, and elongation to break were determined for the BBL-based fibers prepared according to Examples XI and BBL/GS (80/20) according to example XII, respectively. The fibers were mounted on cardboard tabs. Tensile testing was performed on an Instron Universal Tensile Tester (Model 5567) at 2.54 cm gauge length at a strain rate of 2% per minute. Fiber diameters were measured using laser diffraction. About 20 samples of each fiber were tested. The data are given in Table 1.

TABLE 1

Mechanical Properties of BBL and BBL/GS (80/20) composite fibers.

| Fibers (as spun) | Intrinsic viscosity (dL/g) | Graphene (wt %) | Strength (GPa) | Elongation (%) | Modulus (GPa) |
|---|---|---|---|---|---|
| BBL polymer | 22.8 | 0 | 0.83 | 2.50 | 70.6 |
| BBL/Graphene | 17.0 | 20 | 1.92 | 6.15 | 42.3 |

Example XVI

Film Testing—Tensile Modulus, Strength, Elongation

Tensile modulus, tensile strength, and elongation to break were determined for the BBL/GS (80/20), BBL/GS (70/30); and BBL/GS (50/50), and BBL control films, respectively. The films were mounted on cardboard tabs. Tensile testing was performed on an Instron Universal Tensile Tester (Model 5567) at 2.54 cm gauge length at a strain rate of 2% per minute. Films diameters were measured using laser diffraction. About 20 samples of each fiber were tested. The data are given in Table 2.

TABLE 2

Mechanical Properties of BBL, BBL/GS (80/20), BBL/GS (70/30), and BBL/GS (50/50) films.

| | | | BBL/Graphene | | |
|---|---|---|---|---|---|
| Sample | | BBL | 80/20 | 70/30 | 50/50 |
| Tensile Strength (Mpa) | Average | 20.6 | 51.4 | 72.4 | 31.4 |
| | Max | 24.0 | 63.0 | 87.9 | 32.3 |
| Tensile | Average | .97 | 2.05 | 1.31 | 1.33 |

TABLE 2-continued

Mechanical Properties of BBL, BBL/GS (80/20), BBL/GS (70/30), and BBL/GS (50/50) films.

| | | | BBL/Graphene | | |
|---|---|---|---|---|---|
| Sample | | BBL | 80/20 | 70/30 | 50/50 |
| Modulus (Gpa) | Max | 1.20 | 2.06 | 1.81 | 2.09 |
| Tensile Elongation (%) | Average | 6.7 | 13.0 | 9.2 | 8.0 |
| | Max | 8.7 | 16.2 | 11.1 | 9.65 |

Figure 4:
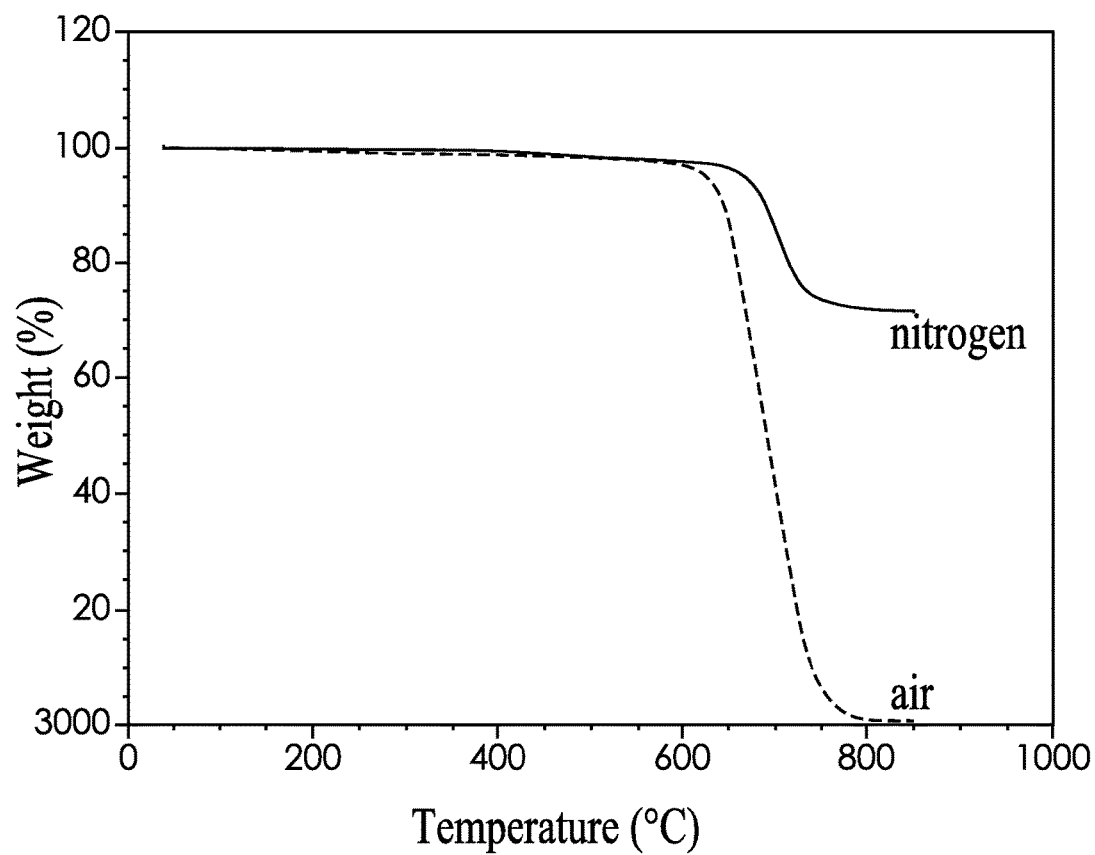
FIG. 4 shows weight loss in BBL/GS(80/20) fiber when heated at 20° C./minute in nitrogen as more fully described in Example XVI.

The data show that the tensile strength as well as elongation to break of BBL/GS (80/20) fibers are higher than comparable measurements of the control BBL by about 231 and 246%, respectively. The data show that tensile modulus, tensile strength, as well as elongation to break of BBL/GS (80/20) films are ah higher than comparable measurements for the control BBL fibers by about 249, 211 and 194%, respectively. The average tensile strength values for the BBL control films varied between 1.8 and 2.6 GPa, while the average tensile strength values for the BBL/GS (80/20) films varied between 2.9 and 4.2. Thus, for various trials, a tensile strength increase of 40 to 60% was obtained by incorporating 20 wt % GS in BBL. The stress-strain curves for BBL/GS (80/20) and BBL control fibers are shown in FIG. 1. Thermal degradation for BBL/GS fiber, conducted at 10° C./min using a TA instruments TGA 2950, show that the onset temperature of degradation as high as 600° C. and 700° C. in air and in nitrogen atmosphere, respectively, as shown in FIG. 4.

Example XVII

Film Testing—Dispersion

Dispersion of graphene nanoparticles in the polymer composite was determined for BBL/GS (80/20), BBL/GS (70/30), and BBL/GS (50/50), and BBL control cast nanocomposite films by x-ray diffraction. The x-ray diffraction data, shown in FIG. 2, demonstrate a 2θ peak at 26.65°, corresponding to interatomic spacing between two graphene monolayers (d-spacing or degree spacing) of 3.35 angstroms. This data illustrates that the stacked graphene monolayers with a 3.35 degree spacing between them have the same degree spacing as graphite (comprising 100 or more layers of graphene).

Figure 2:
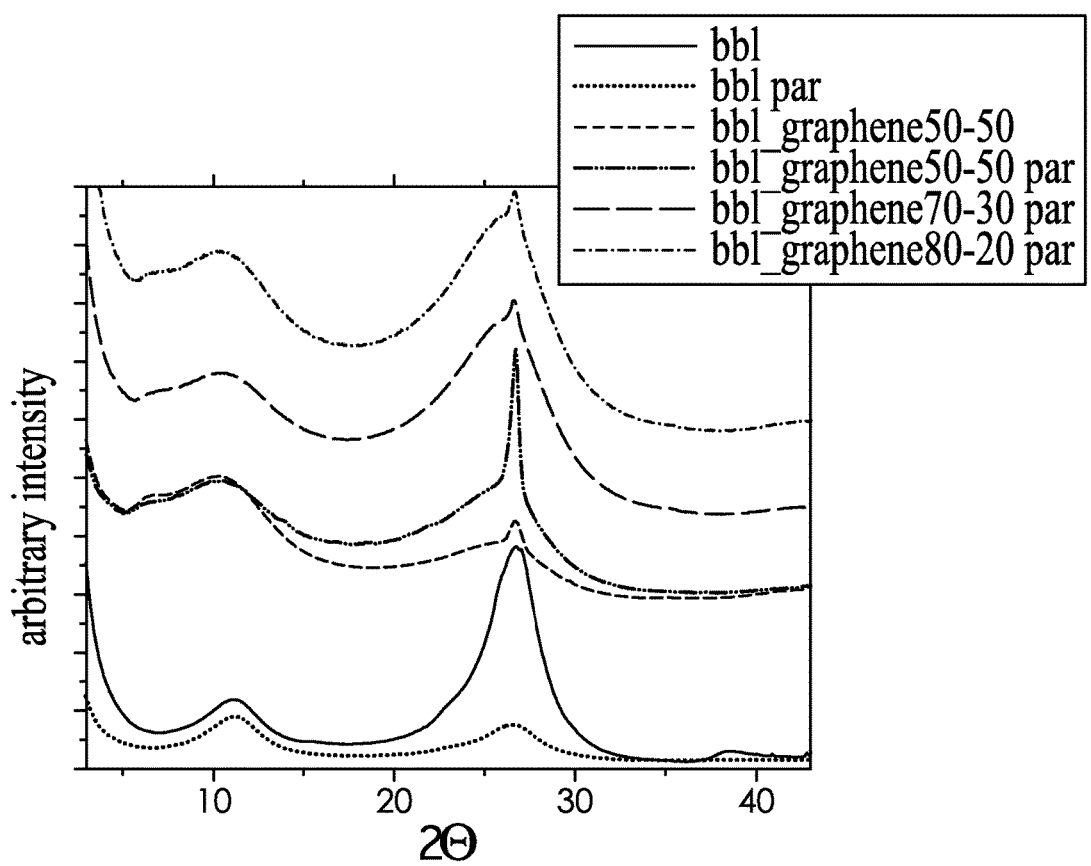
FIG. 2 shows X-ray diffraction pattern of BBL and BBL/GS films as more fully described in Example XVII.
Figure 3:
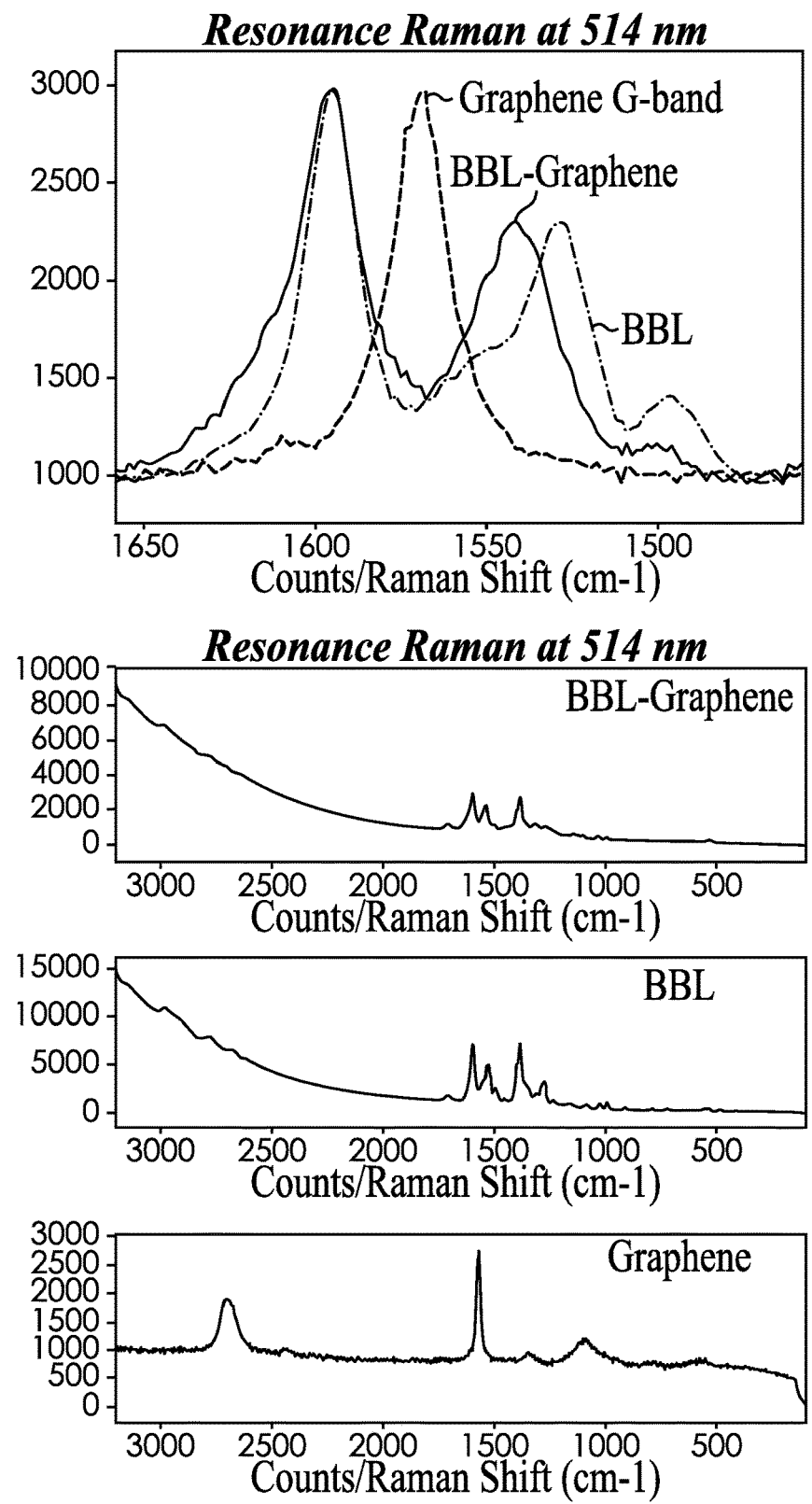
FIG. 3 shows Resonance Raman of Graphene nanoparticle, BBL and BBL/GS films as more fully described in Example XVI.

The number of graphene monolayers in a nanoparticle at the weight loadings indicated above were estimated using the Sherrer formula ($D_p = (K\lambda)/\beta_{1/2} \cos \theta$)), where the Sherrer factor (K) for platelet morphologies is 0.94, the excitation wavelength ($\lambda$) is 1.5418 angstroms, the width at half the maximum intensity ($\beta_{1/2}$) is 0.0112 radians (for 50 wt % loadings), and the peak position of 2θ is 26.65°. The average crystallite size was determined to be 13.29 nm. Using 3.35 nm as the spacing between layers, nanoparticulates at 50 wt % loading were determined to be comprised of approximately 39 layers of graphene. As seen in FIG. 2, 2θ peaks remain approximately constant for graphene loadings of 20 wt %, 30 wt %, and 50 wt %, illustrating no further agglomeration of graphene with increased loadings and constant degree of dispersion.

Figure 5:
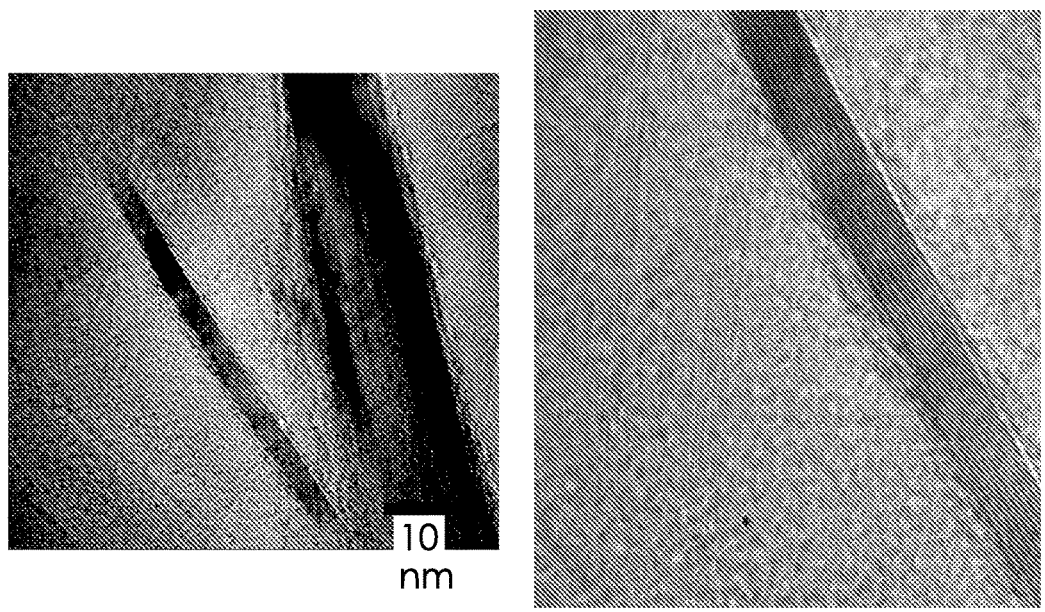
FIG. 5 is a TEM micrograph of BBL/GS (50/50) film with a layered graphene structure as described more fully in Example XVII.
Figure 6:
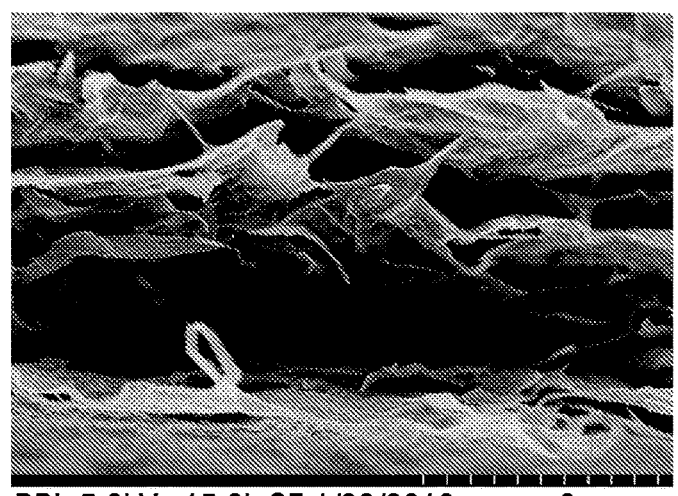
FIG. 6 is a SEM micrograph of BBL/GS (50/50) film with a layered graphene structure as described more fully in Example XVII.

FIGS. 5 and 8 show TEM and SEM micrographs, respectively, of a graphene nanoparticle comprising BBL/GS (50/50). These figures provide optical confirmation of the approximate thickness of the nanoparticle structure and average composition of 5-10 graphene monolayers.

All of the compositions and methods disclosed and claimed herein can be made and executed without undue experimentation in light, of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit scope and concept of the invention as defined by the appended claims.

What is claimed is:

1. A method for preparing a polymer composite comprising a polymer and graphene nanoparticles dispersed in the polymer, the process comprising forming a reaction mixture comprising rigid-rod monomers and oligomers containing repeal units derived from the rigid-rod monomer, the oligomers having, on average, about 5-10 repeat units, adding graphene nanoparticles to the reaction mixture, and polymerizing the reaction mixture to form a polymer composite comprising a polymer and graphene nanoparticles dispersed in the polymer, the polymer comprising at least 50 wt % rigid rod polymer repeat units, wherein the graphene nanoparticles, on average, contain less than 25 planar graphene sheets in a stacked arrangement, and wherein the rigid rod polymer repeat units are derived from repeat units corresponding to Formula 1 or Formula 2

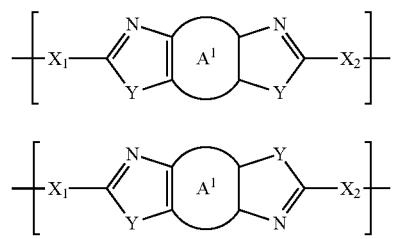

Formula 1

Formula 2 wherein the $A^1$ ring is a six-membered aromatic or a six-membered heterocyclic ring, Y is —O—, —S— or —NR', R' is hydrogen, hydrocarbyl, substituted hydrocarbyl or acyl, and $X_1$ and $X_2$ are independently a bond, para-ordered aryl or para-ordered heterocyclic ring.

2. The method of claim 1 wherein the $A^1$ ring is selected from the group consisting of

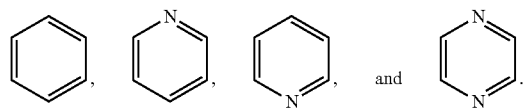

3. The method of claim 1 wherein at least 50 wt % of the polymer is derived from repeat units corresponding to Formula 1A, 1B, 1C, 1D, 2A, 2B, 2C or 2D

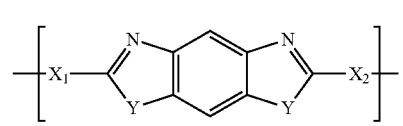

Formula 1A

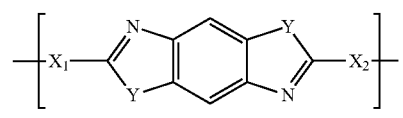

Formula 2A

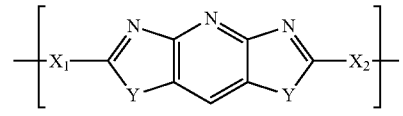

Formula 1B

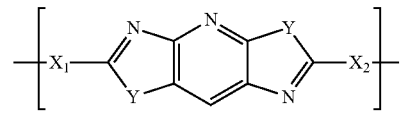

Formula 2B

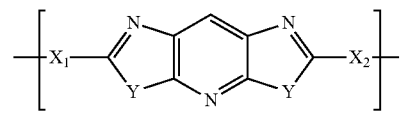

Formula 1C

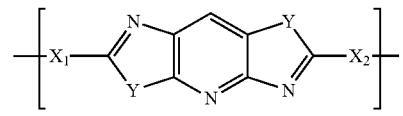

Formula 2C

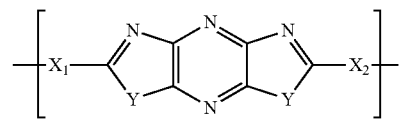

Formula 1D

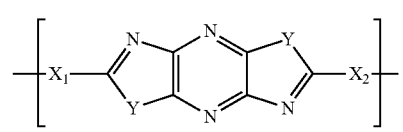

Formula 2D wherein Y, $X_1$ and $X_2$ are as defined in claim 1.

4. The method of claim 1 wherein $X_1$ and $X_2$ are each a bond.

5. The method of claim 1 wherein $X_1$ is a bond and $X_2$ corresponds to Formula 3

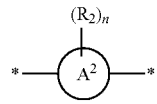

Formula 3 wherein n is 0-4, each $R_2$ is independently hydrogen, hydrocarbyl, substituted hydrocarbyl, hydroxy, halo, phospho (—PO$_3$H), or sulfo (—SO$_3$H), and "*" designates the point of attachment of the $A^2$ ring system to the remainder of the repeat unit.

6. The method of claim 1 wherein $X_1$ is a bond and $X_2$ corresponds to Formula 3A, 3B or 3C

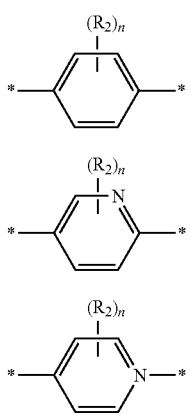

Formula 3A

Formula 3B

Formula 3C wherein n is 0-4, each $R_2$ is independently hydrogen, hydrocarbyl, substituted hydrocarbyl, hydroxy, halo, phospho (—PO$_3$H), or sulfo (—SO$_3$H), and "*" designates the point of attachment of the $A^2$ ring system to the remainder of the repeat unit.

7. The method of claim 3 wherein $X_1$ and $X_2$ independently correspond to Formula 3

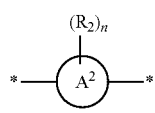

Formula 3 wherein n is 0-4, each $R_2$ is independently hydrogen, hydrocarbyl, substituted hydrocarbyl, hydroxy, halo, phospho (—PO$_3$H), or sulfo (—SO$_3$H), and "*" designates the point of attachment of the $A^2$ ring system to the remainder of the repeat unit.

8. The method of claim 3 wherein $X_1$ is a bond and $X_2$ corresponds to Formula 3A, 3B or 3C

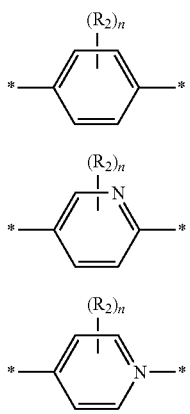

Formula 3A

Formula 3B

Formula 3C wherein n is 0-4, each $R_2$ is independently hydrogen, hydrocarbyl, substituted hydrocarbyl, hydroxy, halo, phospho (—PO$_3$H), or sulfo (—SO$_3$H), and "*" designates the point of attachment of the $A^2$ ring system to the remainder of the repeat unit.

9. The method of claim 1 wherein at least 50 wt % of the polymer is derived from repeat units corresponding to Formula 1I, 1J, 1K, 1L, 2I, 2J, 2K or 2L

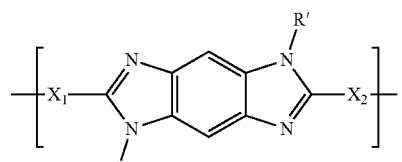

Formula 1I

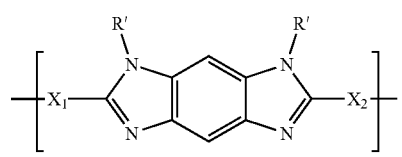

Formula 2I

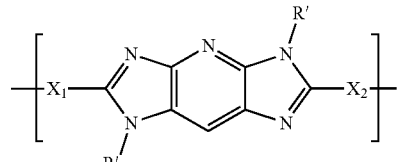

Formula 1J

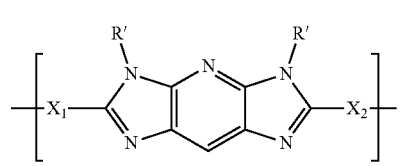

Formula 2J

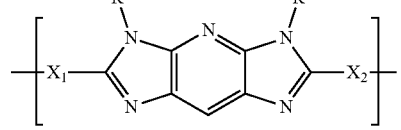

Formula 1K

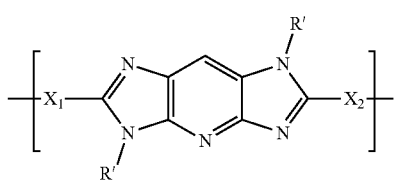

Formula 2K

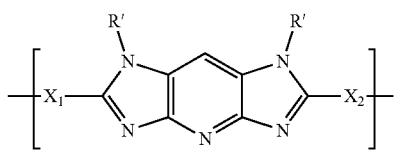

Formula 1L

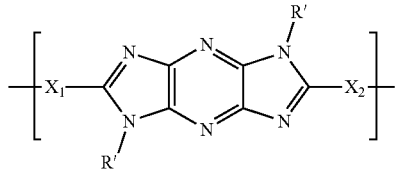

Formula 2L

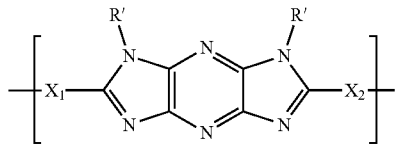

wherein Y, R', $X_1$ and $X_2$ are as defined in claim 1.

10. The method of claim 1 wherein at least 50 wt % of the polymer is derived from rigid rod ladder polymer repeat units corresponding to Formula 6

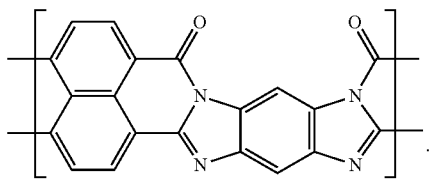

Formula 6

11. The method of claim 1 wherein the graphene nanoparticles are present at a concentration in the range of about 5 wt % to about 50 wt % of the polymer composite.

12. The method of claim 11 wherein the graphene nanoparticles are present at a concentration in the range of about 10 wt % to about 50 wt % of the polymer composite.

13. The method of claim 1 wherein the graphene nanoparticles contain, on average, less than 10 graphene sheets in a stacked arrangement.

14. The method of claim 1 wherein the tensile strength of the polymer composite is at least 50% greater than the tensile strength of the base polymer of the polymer composite.

15. The method of claim 1 wherein the tensile strength of the polymer composite is at least 100% greater than the elongation-to-break property of the base polymer of the polymer composite.

16. The method of claim 1 wherein the graphene nanoparticles are present at a concentration in the range of about 10 wt % to about 50 wt % of the polymer composite and at least 70 wt % of the polymer is derived from rigid rod polymer repeat units.

17. The method of claim 1 wherein the rigid rod polymer contains repeat units selected from the group comprising benzobisazole, pridobisimidazole, and benzamidazobenzophenanthroline.

18. The method of claim 1 further comprising spinning the polymer composite into a fiber.

19. The method of claim 18 wherein the fiber is spun by a dry-jet wet technique.

20. The method of claim 18 further comprising washing and drying the fiber.

* * * * *